(12) United States Patent
Swaine et al.

(10) Patent No.: US 7,197,671 B2
(45) Date of Patent: Mar. 27, 2007

(54) GENERATION OF TRACE ELEMENTS WITHIN A DATA PROCESSING APPARATUS

(75) Inventors: Andrew B Swaine, Welwyn Garden City (GB); David J Williamson, Austin, TX (US)

(73) Assignee: Arm Limited, Cambridge (GB)

( * ) Notice: Subject to any disclaimer, the term of this patent is extended or adjusted under 35 U.S.C. 154(b) by 536 days.

(21) Appl. No.: 10/452,904

(22) Filed: Jun. 3, 2003

(65) Prior Publication Data

US 2004/0030962 A1    Feb. 12, 2004

Related U.S. Application Data

(63) Continuation-in-part of application No. 10/206,829, filed on Jul. 29, 2002, now Pat. No. 7,003,699.

(30) Foreign Application Priority Data

Jun. 7, 2002   (GB) .................... 0213149.8
Dec. 12, 2002  (GB) .................... 0229009.6

(51) Int. Cl.
    *G06F 11/00*    (2006.01)

(52) U.S. Cl. .................... 714/45; 714/30; 717/128; 717/129; 712/227

(58) Field of Classification Search ............ 714/45, 714/30; 717/128; 712/227
See application file for complete search history.

(56) References Cited

U.S. PATENT DOCUMENTS 5,678,028 A    10/1997  Bershteyn et al.
5,724,505 A    3/1998   Argade et al.
5,764,885 A *  6/1998   Sites et al. .................... 714/45

(Continued)

FOREIGN PATENT DOCUMENTS

EP    0 849 670    6/1998

(Continued)

OTHER PUBLICATIONS

UK Combined Search and Examination Report under Sections 17 and 18(3) dated Aug. 23, 2005 in Application No. GB0514709.5.
ARM Limited, "Trace Debug Tools" Version 1.2 User Guide, May 2002.

*Primary Examiner*—Robert Beausoliel
*Assistant Examiner*—Yolanda L Wilson
(74) *Attorney, Agent, or Firm*—Nixon & Vanderhye P.C.

(57) ABSTRACT

A trace module traces changes in a subset of architectural state of a data processing apparatus. A trace generation unit receives input signals from components of the data processing apparatus indicative of a change in the subset of architectural state and generates a number of trace elements indicative of the change to enable a recipient of the trace elements to subsequently reconstruct the subset of architectural state. A table maintained by the trace generation unit identifies an architectural state derivable from previously generated trace elements. The trace generation unit references the table to determine which trace elements to generate. The table reduces the number of trace elements that need to be generated by providing a record of the architectural state which has already been provided to the recipient. Only those trace elements relating to changes in architectural state which are not derivable by the recipient need be generated.

70 Claims, 8 Drawing Sheets

U.S. PATENT DOCUMENTS

| | | |
|---|---|---|
| 5,802,272 A | 9/1998 | Sites et al. |
| 6,148,381 A | 11/2000 | Jotwani |
| 6,167,536 A | 12/2000 | Mann |
| 6,233,678 B1* | 5/2001 | Bala .......................... 712/240 |
| 6,240,544 B1* | 5/2001 | Kaneko ..................... 717/135 |
| 6,615,370 B1 | 9/2003 | Edwards et al. |
| 2002/0178403 A1 | 11/2002 | Floyd et al. |
| 2003/0051122 A1* | 3/2003 | Sato .......................... 712/227 |

FOREIGN PATENT DOCUMENTS

| | | |
|---|---|---|
| EP | 1 130 518 | 9/2001 |
| EP | 1 184 790 | 3/2002 |
| JP | 2001-147835 | 5/2001 |
| WO | WO 02/054245 | 7/2002 |

* cited by examiner

| | Instruction | Data Flow | Instruction Trace | Data Trace | Register Table | Memory Base | Memory Table |
|---|---|---|---|---|---|---|---|
| 1a | LDR r1, [r0] | r1 ← [r0 = 2000] $^{aa}$ | | | - | - | - |
| 1b | | | Inst Ex | | - | - | - |
| 1c | | | | 2000 | - | - | - |
| 1d | | | | | r0 | - | - |
| 1e | | | | aa | r0 | - | - |
| 1f | | | | | r0 | 00002xxx | - |
| 1g | | | | | r0 | 00002xxx | 000 |
| 1h | | | | | r0, r1 | 00002xxx | 000 |
| 2a | ADD r2, r1, #1 | r2 ← r1+#1 $^{ab}$ | | | r0, r1 | 00002xxx | 000 |
| 2b | | | Inst Ex | | r0, r1 | 00002xxx | 000 |
| 2c | | | | | r0, r1, r2 | 00002xxx | 000 |
| 3a | ADD r4, r2, r3 | r4 ← r2 + r3 $^{bb}$ | | | r0, r1, r2 | 00002xxx | 000 |
| 3b | | | Inst Ex | | r0, r1, r2 | 00002xxx | 000 |
| 3c | | | | bb | r0, r1, r2 | 00002xxx | 000 |
| 3d | | | | | r0, r1, r2, r4 | 00002xxx | 000 |
| 4a | STR r4, [r0+#4] | r4 → [2004] $^{b2}$ | | | r0, r1, r2, r4 | 00002xxx | 000 |
| 4b | | | Inst Ex | | r0, r1, r2, r4 | 00002xxx | 000 |
| 4c | | | | | r0, r1, r2, r4 | 00002xxx | 000, 004 |

Fig 4A

| | Instruction | Data Flow | Instruction Trace | Data Trace | Register Table | Memory Base | Memory Table |
|---|---|---|---|---|---|---|---|
| 5a | STR r5, [r0] | r5→[2000] | | | r0, r1, r2, r4 | 00002xxx | 000, 004 |
| 5b | | | Inst Ex | | r0, r1, r2, r4 | 00002xxx | 000, 004 |
| 5c | | | | cc | r0, r1, r2, r4 | 00002xxx | 000, 004 |
| 5d | | | | | r0, r1, r2, r4, r5 | 00002xxx | 000, 004 |
| 6a | MOV pc, r6 | pc←r6 (dd) | | | r0, r1, r2, r4, r5 | 00002xxx | 000, 004 |
| 6b | | | Inst Ex | | r0, r1, r2, r4, r5 | 00002xxx | 000, 004 |
| 6c | | | B→dd | | r0, r1, r2, r4, r5 | 00002xxx | 000, 004 |
| 7a | MOV pc, r1 | pc←r1 (aa) | | | r0, r1, r2, r4, r5 | 00002xxx | 000, 004 |
| 7b | | | Inst Ex | | r0, r1, r2, r4, r5 | 00002xxx | 000, 004 |
| 8a | LDR r2, [r0+#4] | r2←[2004] (bb) | | | r0, r1, r2, r4, r5 | 00002xxx | 000, 004 |
| 8b | | | Inst Ex | | r0, r1, r2, r4, r5 | 00002xxx | 000, 004 |
| 9a | LDR pc, [r0-#4] | pc←[1ffc] (ee) | | | r0, r1, r2, r4, r5 | 00002xxx | 000, 004 |
| 9b | | | Ins Ex | | r0, r1, r2, r4, r5 | 00002xxx | 000, 004 |
| 9c | | | B→ee | | r0, r1, r2, r4, r5 | 00002xxx | 000, 004 |
| 9d | | | | | r0, r1, r2, r4, r5 | - | - |
| 9e | | | | | r0, r1, r2, r4, r5 | 00001xxx | - |
| 9f | | | | | r0, r1, r2, r4, r5 | | ffc |

Fig 4B

GENERATION OF TRACE ELEMENTS WITHIN A DATA PROCESSING APPARATUS

This application is a continuation-in-part of application Ser. No. 10/206,829, filed Jul. 29, 2002 now U.S. Pat. No. 7,003,699, United States, the entire content of which is hereby incorporated by reference in this application.

BACKGROUND OF THE INVENTION

1. Field of the Invention

The present invention relates to the generation of trace elements within a data processing apparatus having one or more components whose behaviour is to be traced.

2. Background of the Invention

Tracing the activity of a data processing system whereby a stream of trace elements is generated including data representing the step-by-step activity within the system is a highly useful tool in system development. However, with the general move towards more deeply embedded processor cores, it becomes more difficult to track the architectural state of the processor core (such as the contents of registers, the values stored at particular memory locations or the status of various buses, paths, lines, flags or modules within processor core or to which the processor core is coupled) via externally accessible pins. Accordingly, as well as off-chip tracing mechanisms for capturing and analysing trace data, increased amounts of tracing functionality are being placed on-chip. An example of such on-chip tracing mechanisms is the Embedded Trace Macrocell (ETM) provided by ARM Limited, Cambridge, England, in association with various of their ARM processors.

Such tracing mechanisms produce in real time a stream of trace elements representing activities of the data processing system that are desired to be traced. This trace stream can then subsequently be used to facilitate debugging of sequences of processing instructions being executed by the data processing system.

It is known to provide tracing mechanisms incorporating trigger points that serve to control the tracing operation, such as starting or stopping tracing upon access to a particular register, memory address, data value. Such mechanisms are very useful for diagnosing specific parts of a system or types of behaviour.

Typically, when the trace is first triggered, the values of all items of architectural state which may need to be reconstructed are traced as a number of trace elements.

Typically, the stream of trace elements that is generated by the ETM is buffered prior to output for subsequent analysis. Such a trace buffer is able to store a finite amount of information and requires a dedicated data bus which has a finite bandwidth over which the elements to be buffered can be received. The trace buffer is generally arranged to store information in a wrap-around manner, i.e. once the trace buffer is full, new data is typically arranged to overwrite the oldest data stored therein. It has been found that the bandwidth of the dedicated data bus limits the rate at which information can be stored in the trace buffer.

Typically, a trace analysing tool is provided which then receives the trace elements from the trace buffer when desired; e.g. once the trace has completed. The trace analysing tool can then reconstruct critical components of the architectural state of the processor core using the stream of trace elements stored in the trace buffer. The trace analysing tool can therefore reconstruct the behaviour of the processor core based on the trace elements.

As data processing systems increase in power and complexity, it is clear that the amount of architectural state and its rate of change will increase. Hence, in order to reliably reconstruct the architectural state it will be appreciated that there is potentially a very large volume of trace elements that need to be traced.

However, there is a problem that there is a finite bandwidth over which the trace elements to be buffered are received and the trace buffer has a finite size. Accordingly, the volume of trace elements that can be buffered, and hence the amount of architectural state that can be reconstructed, is limited.

Hence, it is desired to increase the amount of architectural state that can be reconstructed, given a finite bandwidth over which the trace elements to be buffered are received and a finite size of the trace buffer.

SUMMARY OF THE INVENTION

Viewed from a first aspect, the present invention provides a trace module operable to trace changes in a subset of architectural state of a data processing apparatus with which the trace module is coupled, the trace module comprising: a trace generation unit operable to receive input signals from one or more components of the data processing apparatus indicative of a change in the subset of architectural state and to generate from one or more of the input signals a number of trace elements indicative of the change so as to enable a recipient of the trace elements to subsequently reconstruct the subset of architectural state; and a table maintained by the trace generation unit to identify architectural state derivable from previously generated trace elements, the trace generation unit referencing the table in order to determine which trace elements to generate during the trace generation.

By avoiding the need to generate trace elements for all items of architectural state when tracing begins, and by only tracing the changes in architectural state that are not derivable by the recipient, the amount of architectural state that needs to be generated at any time is significantly reduced compared with prior art approaches.

By providing a table which identifies architectural state which is derivable from previously generated trace elements, the number of trace elements that need to be generated is significantly reduced. This reduction is achieved because the table provides a record of the architectural state which has already been provided to the recipient. Knowing the architectural state which has already been provided to the recipient enables the trace generation unit to determine whether changes in architectural state can be derived or inferred by the recipient. Accordingly, the trace generation unit can refer to the table and only those trace elements relating to changes in architectural state which are not derivable by the recipient need be generated. Hence, if the trace generation unit determines that the recipient is able to derive, infer or calculate architectural state then no trace elements relating to those changes need be generated.

By reducing the number of trace elements that need to be generated, any bandwidth limitations between the trace generation unit and a buffer in which the trace elements are to be stored can be alleviated. Also, because the number of trace elements can be reduced, the size limitation of the trace buffer can also be alleviated and the amount of architectural state that can be traced over the same bandwidth can be increased. Given this increase in the amount of architectural state that can be traced it will be appreciated that the operations of increasingly complex data processing systems can be reliably reconstructed using the same bandwidth.

It will be appreciated that the input signals may take any suitable form which provides the trace generation unit with information relating to the change in architectural state. Also, it will be appreciated that the trace elements may take any suitable form indicative of the change in architectural state which enables the recipient to subsequently reconstruct that change. Furthermore, it will be appreciated that the table may be any arrangement which enables the trace generation unit to determine which trace elements to generate during the trace generation.

In preferred arrangements, the table is cleared at the beginning of the trace and may be periodically cleared thereafter. This helps to ensure that if any corruption in the trace occurs or if an earlier portion of the trace is lost due to, for example, wrap around occurring in the trace buffer overwriting that earlier portion, then only a portion of the trace may be lost and the subsequent trace will be derivable by a trace analysing tool.

Preferably, the subset of architectural state comprises a number of items of architectural state and the table has one or more entries associated with each item of architectural state, the trace generation unit being operable to make an indication in each entry when the item of architectural state is derivable by the recipient.

Each item corresponds to a part of the subset of architectural state. Itemising the architectural state simplifies the maintenance of the table. Whilst a number of entries may be provided for each item of architectural state, preferably each item has just one entry associated therewith. When items of architectural state are derivable by the recipient then an indication is made against the entry associated with those items. The indication may be in any suitable form, such as, for example, a single bit value where a logical '0' indicates that the item is not derivable by the recipient and a logical '1' indicates that the item is derivable by the recipient. It will be appreciated that to make such an indication is a relatively straightforward process and that the resource overhead required to maintain a table in this form is relatively low.

Preferably, in response to the receipt of one or more of the input signals, the trace generation unit is operable to determine whether the change in an item of architectural state is derivable by the recipient by determining whether an indication has been made in each entry associated with that item of architectural state.

Hence, by a simple look-up process in the table, the trace generation unit is able to determine easily whether or not a change in architectural state is derivable by the recipient.

Preferably, in response to the receipt of one or more of the input signals, the trace generation unit is operable to determine whether the change in an item of architectural state is derivable by the recipient by determining whether an indication has been made in each entry associated with items of architectural state utilised to effect the change in the item of architectural state.

Hence, even if the change in architectural state is not directly derivable by the recipient, the trace generation unit can determine whether the change can be derived by determining whether those items of architectural state which were employed in causing the change are themselves derivable. For example, if architectural state A is changed based on architectural state B and C, then even if A is not derivable because no indication has been made in an entry associated with A, if indications have been made in entries associated with B and C, then the trace generation unit is able to determine that the change in architectural state A is derivable by the recipient. It will be appreciated that because, in many data processing apparatus, a comparatively large number of changes in architectural state are dependent upon other items of architectural state, this approach provides a dramatic decrease in the number of trace elements that need to be generated. Given that the number of trace elements that need to be generated is further reduced, this further alleviates any bandwidth limitations between the trace generation unit and the buffer. It will be appreciated that having an indication that an item of architectural state is derivable prior to a change occurring provides no guarantee that this item of architectural state will be derivable after a change occurs since the determination of whether that item of architectural state is derivable is dependent on establishing whether the items which effect the change are derivable or not. To illustrate this by returning to the above example, if an indication has been made that A is derivable, but no indications have been made for B or C, then A will not be derivable and trace elements will need to be generated for change in A because prior knowledge of A is irrelevant since it will be changed in an indeterminate way, dependent on B and C.

Preferably, the trace generation unit is operable to generate a number of trace elements indicative of the change in the item of architectural state not derivable by the recipient and to make an indication in each entry associated with that item of architectural state.

Hence, in the case where it is determined that the recipient will be unable to derive the change in architectural state, the trace generation unit will generate one or more trace elements indicative of that change. It will be appreciated that the trace elements may take any suitable form which enables the recipient to determine the change. The trace generation unit will also make an indication in the entries of the table associated with the item of architectural state that has changed to indicate that that item of architectural state is now derivable by the recipient.

Also, in certain circumstances, entries associated with items of architectural state utilised to effect the change in the item of architectural state may be marked as derivable. For example, if architectural state D is copied to E, and D is not derivable, then a trace element indicative of the change to E is generated and the entry in the table associated with E is updated to indicate that E is derivable as before. However, it will be appreciated that then an entry in the table associated with D may also be updated to indicate that D is derivable since D can be inferred from E, just as E can be inferred from D.

Preferably, each item of architectural state has an architectural state value and the trace generation is operable to generate a number of trace elements indicative of the change in the architectural state value.

Preferably, the change in the architectural state value causes the item of architectural state to have a new value, the trace generation unit being operable to generate a number of trace elements indicative of the new value when the new value is not derivable by the recipient and to make an indication in each entry associated with that item of architectural state.

It will be appreciated that the architectural state of a data processing apparatus may comprise the values of, for example, registers, memory, flip-flops, flags, the status of buses and individual lines or the mode or condition of individual units within the apparatus such as the processor core, bus interface unit, cache, debugging, analysing or profiling logic and the like.

In preferred embodiments, the subset of architectural state comprises the contents of a number of registers and the table has a register entry associated with each of the number of registers.

Hence, the table provides an indication of those registers whose contents are derivable by the recipient.

Preferably, in response to an input signal indicative of a change in the contents of a register to a new value, the trace generation unit is operable to make an indication in each entry associated with that register when the new value is derivable by the recipient.

It will be appreciated that the change in the register value may be dependent upon the contents of the register itself, one or more other registers or the contents stored in one or more memory locations. If the change in the register value is dependent on the contents of one or more memory locations then, in preferred embodiments, a trace element is generated indicative of that memory location.

Preferably, in response to an input signal indicative of a change in the contents of a register to a new value, the trace generation unit is operable to generate a number of trace elements indicative of the new value when the new value is not derivable by the recipient and to make an indication in each entry associated with that register.

Hence, the recipient is provided with an indication of the new value of the register and the table is updated to indicate that the value of that register is now derivable by the recipient.

Preferably, the number of registers include a number of source registers and a number of destination registers and in response to an input signal indicative of a change in the contents of a destination register to a new value dependent on the contents of one or more of the source registers, the trace generation unit is operable to generate a number of trace elements indicative of the new value when the new value is not derivable by the recipient and to make an indication in each entry associated with the destination register.

Hence, even if the contents of a register is not directly derivable by the recipient, the trace generation unit can determine whether the new value can be derived by determining whether the values of the registers or other architectural state upon which the change was made are derivable. For example, consider the operation R4←R2+R3 (i.e. add the value contained in the register R2 to the value contained in the register R3 and place the result in the register R4), if the table indicates that the value of registers R2 and R3 are not both derivable by the recipient, then trace elements are generated which provides the recipient with resultant value of R4 and the table is annotated to indicate that the value of register R4 is derivable by the recipient. Also, it will be appreciated that in circumstances where the new value of the destination register is dependent on other architectural state, the trace generation unit can determine whether the new value can be derived by determining whether the values of the other architectural state is derivable by determining whether an indication has been made in table entries associated with that architectural state, such as, for example, table entries associated with one or more memory addresses or registers.

Preferably, the number of registers include a number of source registers and a number of destination registers and, in response to an input signal indicative of a change in the contents of a destination register to a new value dependent on contents of one or more of the source registers, the trace generation unit is operable to make an indication in each entry associated with the destination register when the new value is derivable by the recipient.

Hence, using the same illustrative example as above, if the table indicates that the value of registers R2 and R3 are both derivable by the recipient, then no trace elements need be generated and the table is annotated to indicate that the value of register R4 is derivable by the recipient. Equally, in circumstances where the new value of the destination register is dependent on other architectural state, if the table indicates that the value of that architectural state is derivable by the recipient, then no trace elements need be generated and the table is annotated to indicate that the value of the destination register is derivable by the recipient.

Preferably, the number of registers include a number of destination registers, the architectural state further comprises the contents of a number of memory addresses and, in response to an input signal indicative of a change in the contents of a destination register to a new value dependent on the contents of one or more of the memory addresses, the trace generation unit is operable to generate a number of trace elements indicative of the one or more memory addresses when the one or more memory addresses are not derivable by the recipient and to make an indication in each entry associated with the one or more memory addresses.

Hence, in addition to the new value being traced, the address which contained that new value may also be traced and an indication made that the contents of that address is now derivable.

Alternatively, the number of registers include a number of destination registers, the architectural state further comprises the contents of a number of memory addresses and, in response to an input signal indicative of a change in the contents of a destination register to a new value dependent on the contents of one or more of the memory addresses, the trace generation unit is operable to make an indication in each entry associated with the one or more memory addresses when the new value is derivable by the recipient.

In preferred embodiments, the subset of architectural state comprises the contents of a number of memory addresses and the table has an address entry associated with each of the number of memory addresses.

Hence, the table provides an indication of those memory addresses whose values are derivable by the recipient. It will be appreciated that the table could be arranged to provide an indication only of those memory addresses whose values are derivable by the recipient. Alternatively, the table could be arranged to provide an indication of those memory addresses and registers or other architectural state whose values are derivable by the recipient.

Preferably, in response to an input signal indicative of the contents of a memory address changing to a new value, the trace generation unit is operable to make an indication in each address entry associated with that memory address when the new value is derivable by the recipient.

It will be appreciated that the change in the value of the memory may be dependent upon the contents of the memory address itself, one or more other memory addresses or the contents stored in one or more registers.

Further, in response to an input signal indicative of the contents of a memory address changing to a new value, the trace generation unit is preferably operable to generate a number of trace elements indicative of the new value when the new value is not derivable by the recipient and to make an indication in each address entry associated with that memory address.

Hence, the recipient is provided with an indication of the new value of the memory address and the table is updated to indicate that the value of that address is now derivable by the recipient.

Preferably, in response to an input signal indicative of the contents of a memory address changing to a new value dependent on one or more registers, the trace generation unit is operable to make an indication in each address entry associated with that memory address when the new value is derivable by the recipient.

Preferably, in response to an input signal indicative of the contents of a memory address changing to a new value dependent on one or more registers, the trace generation unit is operable to generate a number of trace elements indicative of the new value when the new value is not derivable by the recipient and to make an indication in each address entry associated with that memory address.

Preferably, in response to an input signal indicative of the contents of a memory address changing to a new value, the trace generation unit is operable to generate a number of trace elements indicative of the memory address when the memory address is not derivable by the recipient and to make an indication in each register entry providing that memory address.

In preferred embodiments, the table comprises one or more tables, each having a base address entry associated with a base memory address and an address entry associated with each of a range of memory addresses logically offset from the base address, the trace generation unit being operable to determine, in response to an input signal indicative of the contents of a memory address changing to a new value, whether the memory address is within one of the ranges and, if so, to make an indication in the address entry associated with that memory address.

Providing a base address and a range of memory addresses offset from that base address enables a logical memory address to be specified with a reduced number of bits which in turn advantageously enables a reduced table size. For example, suppose a memory has $2^n$ entries or logical addresses. If a table was to be provided with an indication of whether each of these entries was derivable then clearly the table would also require $2^n$ entries. However, it is recognised that it is often the case that a given sequence of processor operations results in memory accesses occurring only in a particular sub-set or range of the memory. Hence, the table is arranged to provide an address entry associated with each of a range of memory addresses. To enable addresses of the whole memory to be specified, a base address is also provided, the range being offset from this base address. Referring back to the above example, assuming a memory having $2^n$ addresses, a table could be provided having a range of $2^{n/4}$ entries. Each of these entries can be specified using n/4 bits, and to enable addresses in the whole memory to be specified a base address having 3n/4 bits would need to be provided. It will be appreciated that the size of the table and range could be selected to suit the particular implementation.

Preferably, the trace generation unit is operable to determine, in response to an input signal indicative of the contents of a memory address changing to a new value, whether the memory address is within one of the ranges and, if not, to clear all address entries in one of the tables, to update the base address entry of that table, to generate a number of trace elements indicative of the new value and to make an indication in the address entry associated with the memory address.

Hence, when a change occurs in the value being stored at a memory address outside of the range currently covered by a table, a new base address is selected such that the memory address whose value has changed falls within the range provided by the table. Also, all the entries associated with addresses are preferably cleared since these entries now relate to addresses whose values may not be derivable by the recipient and following the generation of the trace elements, an indication is made in the address entry associated with the memory address whose value has changed that the value is derivable by the recipient. Whilst just one table could be provided it will be appreciated that a number of further tables could be provided, each having a base address and covering different regions of the memory. Such an arrangement would have particular utility if the operation being traced involved branching to and from different parts of the memory.

Preferably, the base address entry is arranged to store at least part of a logical memory address.

Hence, for any logical memory address, the base address bits could be arranged to form the most significant bits (MSBs) of the logical memory address and the address entry bits the least significant bits (LSBs) of the logical memory address. Alternatively, the base address may comprise the MSBs of the logical memory address referred to by the contents of a stack pointer register. It will be appreciated that for some data processing apparatus, utilising the stack pointer register provides a good indication of an efficient location for the base address.

In preferred embodiments, entries in said table are cleared periodically.

As explained above, this helps to ameliorate the effects of any corruption in the trace.

In preferred embodiments, the trace generation unit is operable to generate an instruction trace element indicative of an instruction being executed.

The instruction trace element provides the recipient with information relating to the instruction being executed by the data processing apparatus such as, for example, a branch or data processing operation. Providing the recipient with an instruction trace further simplifies the reconstruction of the architectural state by assisting the recipient in determining which instruction is being executed at any particular time and, hence, to which architectural state any trace elements relate.

Preferably, the change in the subset of architectural state causes the data processing apparatus to execute an instruction which is out of sequence and the trace generation unit is operable to generate a trace element indicative of the out of sequence instruction to be executed.

Hence, should an instruction be executed which results in, for example, a branch being performed, then the recipient is provided with an indication of which instruction in the sequence of instructions is to be executed next in order to assist in interpreting trace elements being received.

In preferred embodiments, the recipient is a trace analysing tool and the table identifies the subset of architectural state derivable by the trace analysing tool.

Preferably, the trace analysing tool is provided with an indication of sequential instructions to be executed by the data processing apparatus.

Providing the trace analysing tool with information relating to the instructions being executed by the data processing apparatus, such as for example opcode, simplifies the interpretation of the trace elements provided by the trace generation unit when reconstructing the architectural state.

Hence, it will be appreciated that the trace analysing tool effectively models the operation of the processor core. Accordingly, for example, if the trace analysing tool receives one or more trace elements and is also provided with an indication that an instruction is being executed involving architectural state A, B and C which results in architectural state D being changed, then the trace analysing tool is able to derive that the trace elements will relate to the change in architectural state D.

Preferably, each sequential instruction has an address associated therewith and the trace generation unit is operable to determine whether an address of the out of sequence instruction is derivable by the trace analysing tool by determining whether an indication has been made in each entry associated with items of architectural state utilised to effect the change in the item of architectural state which causes the data processing apparatus to execute the out of sequence instruction.

Hence, if the trace analysing tool is able to derive the address of the out of sequence instruction, then no trace elements need be generated indicating the address of the next instruction to be performed.

Preferably, the table identifies the indication of sequential instructions to be executed by the data processing apparatus.

As mentioned above, it will be appreciated that the table identifying the indication of sequential instructions to be executed may be a separate table or tables. Also, as mentioned above, the table preferably includes the opcode to be executed by the data processing apparatus.

Preferably, the trace generation unit is operable to determine in response to the input signals indicative of an instruction being executed whether the trace analysing tool is able to determine the instruction being executed by referencing the table and to generate a number of trace elements indicative of the instruction when the instruction is not derivable by the trace analysing tool.

It will be appreciated that typically when a change to a register which is used by the data processing apparatus to determine the address of the next instruction to be executed (such as a so-called program counter) occurs as a result of an indirect branch (indirect branches are branches in the sequence of instructions executed by the data processing apparatus which occur not as a result of the issue of a conventional branch instruction but are due to the manipulation of the program counter by, for example, a load instruction or a move instruction) then a data trace will be issued and a branch trace will be issued. The data trace typically occurs because it is desired to trace the data associated with the load or move instruction (e.g. operand data, result data, etc.). The branch trace also occurs because it is determined that the instruction has resulted in a branch occurring and provides an indication of the address of the next instruction to be executed (i.e. the new program counter value).

According to a second aspect of the present invention there is provided a trace module operable to trace changes in a program counter value of a data processing apparatus with which the trace module is coupled, the data processing apparatus being arranged to execute a sequence of instructions, the program counter value indicating a next instruction to be executed by the data processing apparatus, the trace module comprising: a trace generation unit operable to receive input signals from one or more components of the data processing apparatus indicative of a current instruction being executed and to selectively generate from the input signals a data trace element indicative of data associated with the current instruction and a branch trace element indicative of the change in program counter value, and in the event that the current instruction is an indirect branch instruction which causes a non-sequential change in the program counter value, the trace generation unit being operable to suppress the generation of either the data trace element or the branch trace element, the change in program counter value being derivable from the generated trace element, whereby change in program counter value can be subsequently reconstructed by a recipient of the trace elements from the generated trace element in order to determine the next instruction to be executed by the data processing apparatus.

Recognising that the change in the program counter value can be derived from either of the data trace or the branch trace enables one of these traces to be suppressed thereby reducing the amount of trace generated. In particular, since the data trace element will identify the result data, and in the event of an indirect branch instruction this will identify the new program counter value, the data trace element itself will enable the new program counter value to be derived.

It will be appreciated that knowing the value stored in the program counter enables the recipient to determine the next instruction to be executed by the data processing apparatus. It will also be appreciated that in so-called pipelined data processing apparatus, the program counter may refer to the next instruction to be loaded or passed to any particular pipeline stage (such as any one of a fetch, decode, execute or writeback stage) or to the next instruction to be fetched by, for example, a prefetch or other unit.

Preferably, the trace generation unit is operable to suppress the generation of the data trace element, the change in program counter value being derivable by the recipient from the branch trace element.

Hence, the need to generate the data trace element is avoided since this information is duplicated by the branch trace element which provides an indication of the new program counter value (i.e. the result data of the indirect branch instruction). It will be appreciated that suppressing the data trace element reduces the amount of data to be traced.

Alternatively, the trace generation unit is operable to suppress the generation of the branch trace element, the change in program counter value being derivable by the recipient from the data trace element.

Hence, the need to generate the branch trace element is avoided since this information is duplicated by the data trace element which provides an indication of the change in value of the program counter. It will be appreciated the suppressing the branch trace element reduces the amount of data to be traced.

Preferably, there is provided a table maintained by the trace generation unit to identify whether the change in program counter value is derivable from previously generated trace elements, the trace generation unit referencing the table in order to determine which trace elements to generate during the trace generation.

By providing a table which identifies whether the change in program counter value is derivable from previously generated trace elements, the number of trace elements that need to be generated can be significantly reduced. This reduction is achieved because the table provides a record of whether the changed program counter value has already been provided to the recipient. Knowing whether the program counter value has already been provided to the recipient enables the trace generation unit to determine whether changes in the program counter value can be derived or inferred by the recipient. Accordingly, the trace generation unit can refer to the table and only those trace elements relating to changes in the program counter value which are not derivable by the recipient need be generated. Hence, if the trace generation unit determines that the recipient is able to derive, infer or calculate the program counter value then no trace elements relating to those changes need be generated and any duplication of trace elements can be avoided.

Preferably, the trace generation unit is operable to suppress the generation of the data trace element and the branch trace element when it is determined that the change in program counter value is derivable by the recipient.

Hence, when it is determined that the change in the value of the program counter is derivable and the address of the next instruction to be executed is derivable, both the data trace element and the branch trace element may be suppressed since this information derivable by the recipient. It will be appreciated that suppressing the generation of both the data trace element and the branch trace element significantly reduces the amount of trace which is generated.

Preferably, the trace generation unit is operable to generate a placeholder indicative of the suppression.

Providing a placeholder gives a convenient indication to the recipient that suppression has occurred because the address of the next instruction to be executed is derivable.

Preferably, the trace generation unit generates an instruction trace in response to receipt of the input signals providing an indication that an instruction is being executed by the data processing apparatus.

By providing an indication that an instruction is being executed, a change in the program counter value can be inferred. This is because typically each time an instruction is executed the program counter will be incremented by a predetermined value such as, for example. 'm' bits such that the program counter is pointing to the address of the next sequential instruction in memory. It will be appreciated that the amount of data required to provide an indication that the program counter has been incremented would be significantly less than the data required to identify the program counter as an item whose value has changed and then to identify that new value.

According to a third aspect of the present invention there is provided a data processing apparatus comprising the trace module according to the first and second aspect of the present invention.

According to a fourth aspect of the present invention there is provided a method of tracing changes in a subset of architectural state of a data processing apparatus, the method comprising the steps of: receiving input signals from one or more components of said data processing apparatus indicative of a change in said subset of architectural state; determining which trace elements to generate by referencing a table identifying architectural state derivable from previously generated trace elements; and generating a number of trace elements indicative of said change so as to enable a recipient of said trace elements to subsequently reconstruct said subset of architectural state.

According to a fifth aspect of the present invention there is provided a method of tracing changes in a program counter value of a data processing apparatus, the data processing apparatus being arranged to execute a sequence of instructions, the program counter value indicating a next instruction to be executed by the data processing apparatus, the method comprising the steps of: receiving input signals from one or more components of the data processing apparatus indicative of a current instruction being executed; selectively generating from the input signals a data trace element indicative of data associated with the current instruction and a branch trace element indicative of the change in program counter value; and in the event that the current instruction is an indirect branch instruction which causes a non-sequential change in the program counter value, suppressing the generation of either the data trace element or the branch trace element, the change in program counter value being derivable from the generated trace element.

According to a sixth aspect of the present invention there is provided a computer program product stored on a computer readable medium operable when executed on a computer to perform the steps of the fourth and fifth aspect of the present invention.

BRIEF DESCRIPTION OF THE DRAWINGS

FIGS. 4A and 4B illustrate example instructions executed by the processor core together with the associated trace elements and table entries generated by the on-chip trace module.

DESCRIPTION OF A PREFERRED EMBODIMENT

Figure 1:
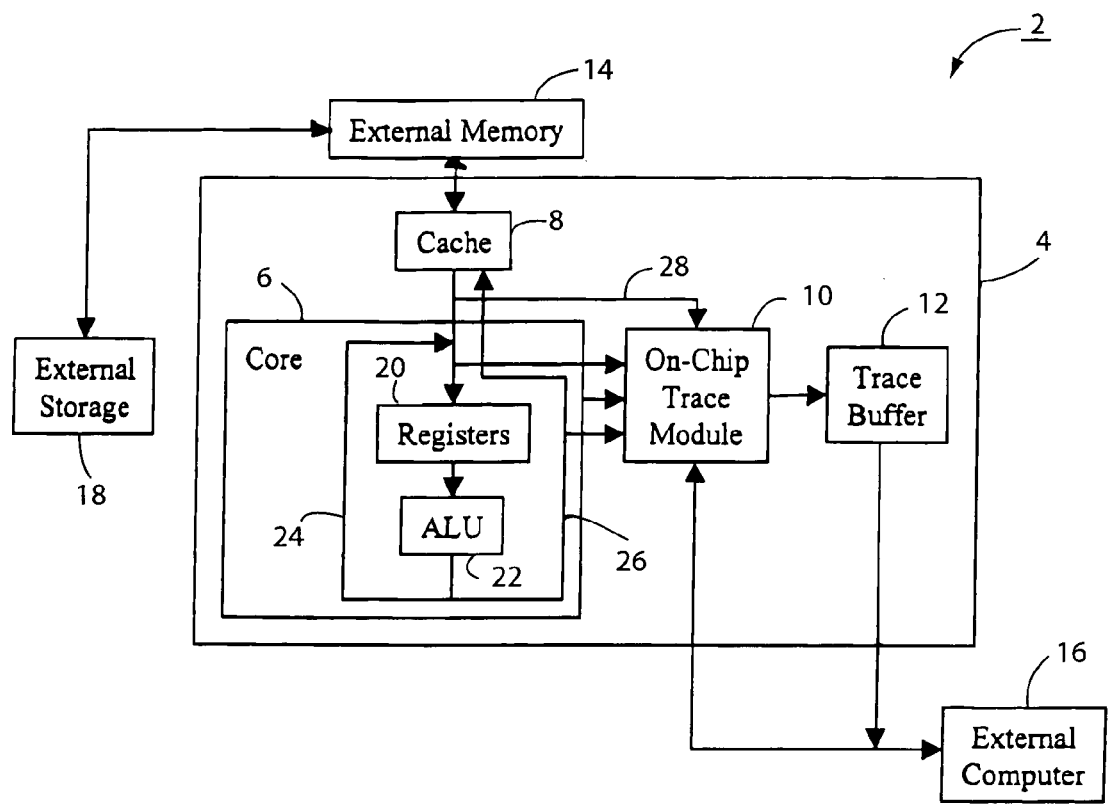
FIG. 1 illustrates a data processing apparatus according to an embodiment of the present invention.

FIG. 1 schematically illustrates a data processing apparatus 2 providing an on-chip trace module. An integrated circuit 4 includes a microprocessor core 6, a cache memory 8, an on-chip trace module 10 and an on-chip trace buffer 12. It will be appreciated that whilst this illustrative embodiment shows an on-chip trace module and on-chip trace buffer 12, it will be appreciated that the trace module and/or trace buffer could instead be provided separately and coupled with the integrated circuit 4 or processor core 6.

The data processing apparatus 2 has architectural state associated therewith. Typically, some architectural state is associated with each instruction the processor core 6 is executing. Other architectural state will relate to overall operation or status of the processor core or other modules or units to which the processor core 6 or data processing apparatus 2 is coupled. Such architectural state may include the contents of registers, the values stored at particular memory locations or the status of various buses, paths, lines, flags or modules within the data processing apparatus 2 or to which the data processing apparatus 2 is coupled.

A general purpose computer 16 is coupled to the on-chip trace module 10 and the on-chip trace buffer 12. The general purpose computer 16, operating as a trace analysing tool, and under the control of software being executed thereon, recovers a stream of tracing data which is composed of a number of trace elements. These trace elements are then analysed by the trace analysing tool. The trace elements provide information which is used to reconstruct the architectural state of the data processing apparatus 2. By reconstructing the architectural state of the data processing apparatus 2, the step-by-step activity within the data processing apparatus 2 can be determined which is useful when attempting to debug sequences of processing instructions being executed by the data processing apparatus 2. The trace analysing tool is preferably provided in advance with the sequence of instructions being executed by the processor core 6 which is referred to when reconstructing the architectural state of the data processing apparatus 2.

The integrated circuit 4 is connected to an external memory 14 which is accessed when a cache miss occurs within the cache memory 8. It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit memory addresses, thereby enabling 4 GB of instructions and data to be specified. Accordingly, all of the instructions and data required by the processor core 6 are stored within external storage 18, for example a hard disk, and then when the processor core 6 is to operate in a particular state of operation, the relevant instructions and data for that state of operation are loaded into the external memory 14. The contents and status of the cache memory 8, the external memory 14 and the external storage 18 are items of architectural state which are often necessary to trace in order to accurately reconstruct the operation of the processor core 6.

Within the processor core 6 is provided a register bank 20 containing a number of registers for temporarily storing data. An arithmetic and logic unit (ALU) 22 is also provided for performing various arithmetical or logical operations on the contents of the registers. Following an operation by the ALU 22, the result of the operation may be either recirculated into the register bank 20 via the bus 24 and/or stored in the cache 8 over the bus 26. The contents and status of the register bank 20 or the status of the ALU 22 or the internal or external buses are also items of architectural state which are often necessary to trace in order to accurately reconstruct the operation of the processor core 6.

Figure 2:
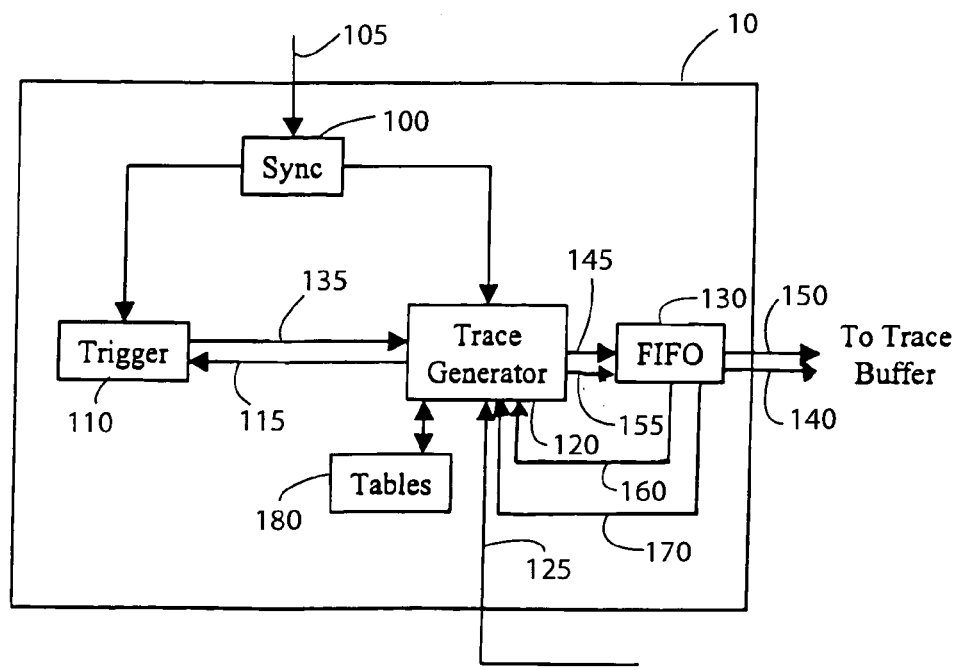
FIG. 2 illustrates features of the on-chip trace module of FIG. 1.

FIG. 2 is a block diagram illustrating in more detail the components provided within the on-chip trace module 10 of FIG. 1. The on-chip trace module 10 is arranged to receive over path 105 data indicative of the processing being performed by the processor core 6. With reference to FIG. 1, this may be received from the buses 24 and 26 connecting the processor core 6, cache 8, and on-chip trace module 10 (such data providing an indication of the architectural state of the data processing apparatus 2 such as, for example, indicating instructions and/or data presented to the processor core 6, and data generated by ALU 22 of the processor core 6), along with additional control-type data received directly from the core over bus 28 (also providing an indication of the architectural state of the data processing apparatus 2 such as, for example, an indication that the instruction address is being indexed, an indication that a certain instruction failed its condition codes for some reason, etc). As will be appreciated by those skilled in the art, in certain embodiments both types of data could be passed to the trace module 10 over a single bus between the trace module 10 and the processor core 6 (rather than using multiple buses 24, 26, 28 etc.).

The sync logic 100 is arranged to convert the incoming signals into internal versions of the signals more appropriate for use within the on-chip trace module 10. These internal versions are then sent to the trigger 110 and the trace generation logic 120, although it will be appreciated that the trigger 110 and the trace generation logic 120 will not necessarily need to receive the same signals. Fundamentally, the trigger 110 needs to receive data relating to triggerable events, for example instruction addresses, data values, register accesses or the occurrence of some other architectural state. The trace generation logic 120 needs to receive any data that would need to be traced dependent on the enable signals issued by the trigger 110. The trace generation logic 120 is further arranged to receive configuration information over path 125 from the general purpose computer 16, whose contents can be read by the components of the on-chip trace module 10 as required.

Whenever the trigger 110 detects events which should give rise to the generation of a trace stream, it sends an enable signal over path 135 to the trace generation logic 120 to turn the trace on and off. The trace generation logic 120 reacts accordingly by outputting the necessary trace elements to the FIFO 130 over paths 145 and 155. It will be appreciated that a variety of enable signals may be provided over path 135, to identify the type of signals which should be traced, for example trace only instructions, trace instructions and data, etc.

Typically, the trace signals or trace elements generated by the trace generation logic 120 are classified as being either high priority or low priority. The classification will preferably be maintained within the trace generation block 120, and may be predefined or user programmable. In the embodiment illustrated in FIG. 2, the high priority trace elements are those concerning instruction trace, for example trace signals relating to branch addresses, whilst the low priority trace elements are those relating to data trace, such low priority trace elements being able to be lost without losing synchronisation. In the absence of any signals being received by the trace generation logic 120 from the FIFO 130, the trace generation logic will be arranged to output appropriate trace data to the FIFO 130 dependent on the enable signals received from the trigger 110 over path 135. This might for example result in both instruction trace elements being issued over path 145 and data trace elements being issued over path 155. It will be appreciated by those skilled in the art that although two distinct paths have been illustrated in FIG. 2, both the instruction trace and the data trace signals would typically share connections between the trace generation logic 120 and the FIFO 130.

It has been found that when tracing data in addition to tracing instructions, the data trace elements issued over path 155 can use the majority of the trace port bandwidth from the trace generation logic 120 to the FIFO 130. The trace elements are then drained through a narrow output trace port from the FIFO 130 to the trace buffer 12 via path 150. Typically, any trace elements issued over path 150 to the trace buffer are also accompanied by trace valid signals over path 140 indicating whether the output trace is valid or not. A trace valid signal would typically be set to invalid if the associated trace module has no trace data to issue in that clock cycle.

Since the output bandwidth from the FIFO 130 is typically less than the input bandwidth, there is the potential for the FIFO 130 to overflow, for example in the event of a sustained burst of trace data being issued by the trace generation block 120. As an example, the input trace port can be 4–5 times wider than the output trace port to the trace buffer.

One previously-known way to seek to alleviate this problem was to cause a FIFO full signal to be issued from the on-chip trace module 10 back to the processor core 6 to cause the processor core 6 to stall temporarily so as to allow the level of trace elements within the FIFO 130 to reduce. However, due to the inherent latency and other issues, this approach has proved to be unreliable, since it was often found that between the time of issuance of the FIFO full signal and the stalling of the processor core 6, sufficient further trace elements were issued representing the activities of the core 6 prior to its stalling that the FIFO 130 had a tendency to overflow in any event.

Another approach to alleviate this problem is described in co-pending U.S. patent application Ser. No. 10/206,829 (filed Jul. 29, 2002, and in turn claiming priority to UK patent application 0213149.8, filed Jun. 7, 2002) in which a suppression signal is provided which can be issued by the FIFO 130 over path 160 directly to the trace generation logic 120. Preferably, the FIFO 130 is arranged such that once the fullness of the FIFO 130 reaches a predetermined suppression level, the FIFO 130 is arranged to issue the suppression signal to the trace generation logic 120, this causing the trace generation logic 120 to cease issuing any data trace elements over path 155 whilst the suppression signal is asserted. Whilst this means that the data trace elements are lost, these are considered to be low priority trace elements which can be lost without losing synchronisation information. Furthermore, since the data trace typically uses much larger bandwidth than the high priority instruction trace, the suppression of the data trace has been found to often be sufficient to avoid the FIFO 130 becoming full.

When the quantity of trace elements within the FIFO 130 subsequently falls to a predetermined restart level, then the FIFO 130 is arranged to de-assert the suppression signal, thereby causing the trace generation block 120 to again begin issuing data trace elements over path 155.

It will be appreciated that the predetermined suppression level and predetermined restart level can be chosen dependent on the implementation. However, by way of example, for a 60 byte FIFO, the predetermined suppression level may be set at 45 bytes (i.e. when the FIFO is 75% full), whereas typically the predetermined restart level will be set at some slightly lower value than 45 bytes to ensure that subsequent to the de-assertion of the suppression signal there is still some capacity to increase the amount of trace elements stored within the FIFO without needing to immediately re-assert the suppression signal.

Since the act of merely discarding the data trace elements upon issuance of the suppression signal cannot in all circumstances avoid the FIFO 130 overflowing, the FIFO 130 is able to issue an overflow signal over path 170 when it becomes full, to cause the trace generation logic 120 to stop issuing any trace elements until the overflow signal is de-asserted. In such scenarios, it will be apparent that both high and low priority trace data will be lost, but by appropriate choice of the predetermined suppression level at which the suppression signal is issued, it is envisaged that it would only be on very rare occasions that the overflow signal would need to be issued.

Alternatively, in addition to issuing the suppression signal to the trace generation logic 120, the FIFO 130 may also take the additional internal step of only storing instruction trace elements after the suppression signal is asserted (thereby removing any latency between issuance of the suppression signal and the responding to that suppression signal by the trace generation logic 120).

It will be appreciated that all of these techniques seek to minimise the effects of overflowing in the FIFO 130 by suppressing or stalling the generation of that data or by allowing certain elements to be lost. It will also be appreciated that losing trace elements is undesirable and that, in some circumstances, stalling the processor may uncharacteristically influence its operation or conceal a potential error or fault.

However, embodiments of the present invention further recognise that if the quantity of trace elements generated in the first place is lower, then the likelihood of any overflow downstream of the trace generation logic 120 will be reduced. Accordingly, embodiments of the present invention recognise that there is a degree of redundancy in the trace elements themselves which, if removed, will enable the amount of trace elements generated to be reduced.

The redundancy can occur due to, for example, the repetition of previously-generated trace elements. Such repetition can occur when, for example, a trace element is issued which includes architectural state and a subsequent trace element is issued although that particular architectural state has not changed. Given that the architectural state has not changed, embodiments of the present invention recognise that it could have been derived, inferred or implied from previously-generated trace elements. Hence, by deriving the architectural state, the repetition of such previously-generated trace elements can be eliminated, thus reducing the amount of trace elements generated by the trace generation logic 120.

It is also recognised that redundancy can also occur due to, for example, trace elements being generated in response to a change which could have been determined. Such determination is possible when, for example, a trace element is to be issued which includes information relating to a change in architectural state and the architectural state which was used to cause the change has been provided in trace elements generated previously. Given that the architectural state is dependent on previously-generated trace elements, it could have been determined or calculated from those previously-generated trace elements. Hence, the generation of trace elements which can be determined can be eliminated, thus further reducing the amount of trace elements generated by the trace generation logic 120.

Hence, the amount of trace elements generated by trace generation logic 120 can be limited to that which is not derivable by a trace analysing tool. As mentioned above, it will be appreciated that architectural state will be derivable by the trace analysing tool if it has been provided in trace elements issued by the trace generation logic 120 previously or can be deduced from those previously provided trace elements.

In order to enable the trace generation logic 120 to determine whether a change in architectural state is derivable by the trace analysing tool, the trace generation logic 120 maintains a record of architectural state for which trace elements have been provided. In this illustrative embodiment, this record is provided in the form of a number of tables 180. The tables 180 may comprise a register table, a memory table and an instruction memory table. Also, more than one register table, memory table and instruction memory table may be provided. The provision of than one memory table is particularly suited to situations where subroutines or other sequences of instruction are executed which result in branches to particular regions of memory or where multiple stacks are created. However, it will be appreciated that the record could take any suitable form and may comprise just one table.

An entry is provided in the tables for each item of architectural state that is to be traced. As will be described in more detail below, an indication is made against that entry when it is determined that the value of that item of architectural state can be derived by the trace analysing tool. Hence, when a change occurs the trace generation logic 120 can reference the entries to determine which items of architectural state are not derivable and to generate trace elements for those items accordingly.

FIGS. 3A to 3E illustrate processing steps performed by the on-chip trace module 10 when generating trace elements in conjunction with the tables 180. The processing described assumes that a triggerable event has occurred, that trigger 110 has enabled the trace generation logic 120 to generate trace elements and that the instruction in the position in the reference opcode stored in the trace analysing tool has been synchronised with the instruction being executed by the processor core 6. The architectural state which is traced in this illustrative example only includes registers and memory addresses although it will be appreciated that any architectural state may be traced.

Figure 3A:
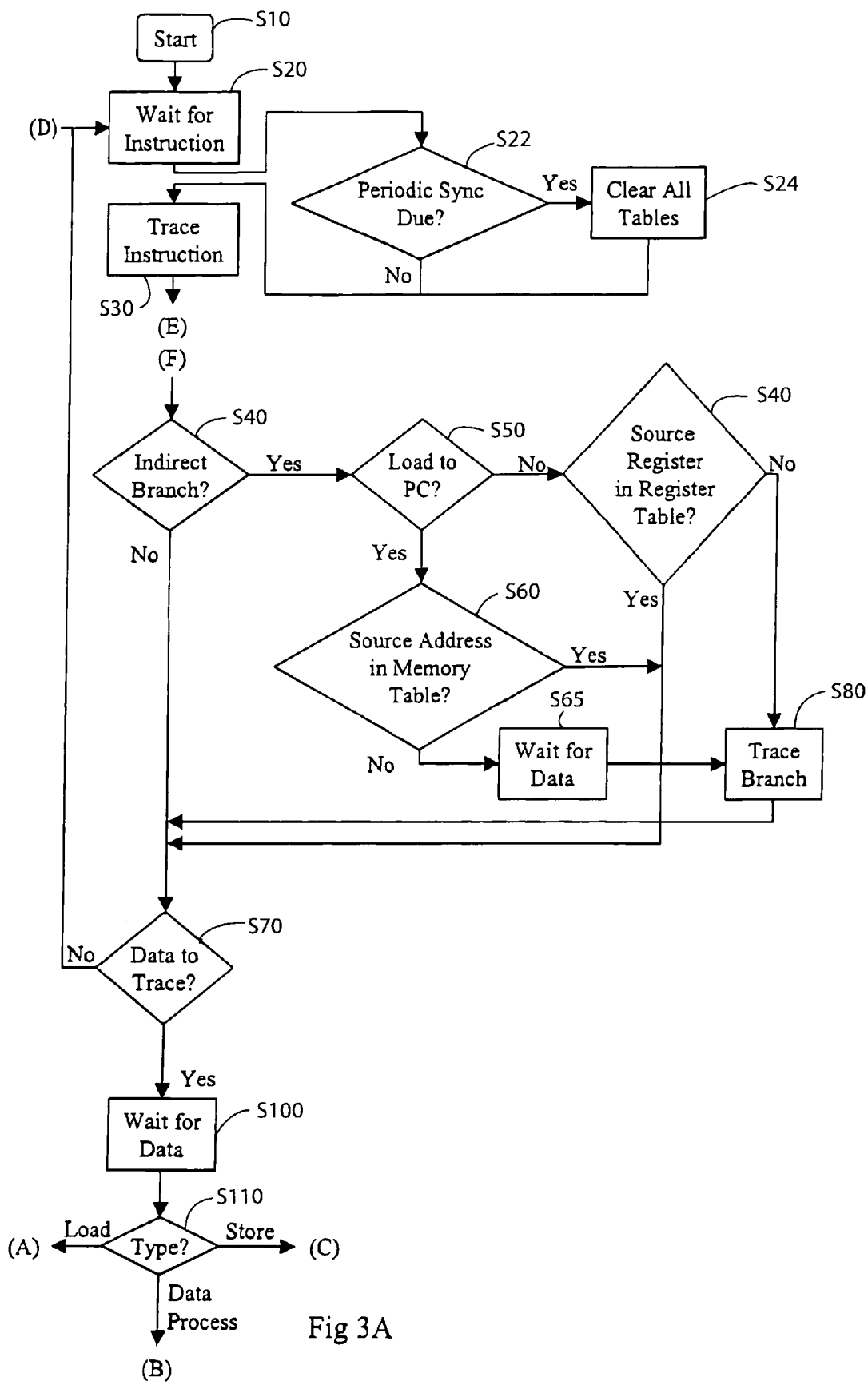
FIGS. 3A to 3E illustrate processing steps performed by the on-chip trace module.

FIG. 3A, in overview, illustrates the main steps taken by the trace generation logic 120, once enabled, in the generation of trace elements. The main steps taken in response to receipt of data indicative of an instruction being executed by the processor core 6 are illustrated which involve generating an instruction trace and then performing steps that trace branch instructions and also trace data.

Processing begins at step S10 and proceeds to step S20.

At step S20, the trace generation logic 120 waits for an indication that an instruction is being executed by the processor core 6.

Once the indication is received processing proceeds to step S22 where an optional routine of periodic clearing of the tables may be performed. As mentioned previously, such periodic clearing of the tables helps to ensure that if any corruption in the trace occurs then only a portion of the trace may be lost. If corruption occurs then the trace generation logic 120 may assume that some architectural state is derivable by the trace analysing tool whereas in fact this is not the case because either the trace analysing tool did not receive trace elements or the trace elements were corrupted in some way. By clearing the tables it is assumed that no architectural state is derivable by the trace analysing tool which effectively resets the process. Hence, subsequent changes are traced and the tables updated accordingly. If the periodic clearing of tables is to be performed then processing proceeds to step S24 where entries in the tables are cleared. It will be appreciated that all entries in all tables could be cleared or alternatively different tables or portions of tables may be cleared at different times in order to reduce out the number of trace elements that would need to be generated.

Processing then proceeds to step S30 where an instruction trace element is issued to the FIFO 130. The instruction trace element ensures that synchronisation is maintained between the opcode being processed by the processor core 6 and the reference opcode stored in the trace analysing tool. The instruction trace, in its simplest form may be merely an indication that the processor core 6 has moved onto the next instruction without necessarily providing any information on what that instruction may be.

Thereafter, an optional sequence involving the tracing of the opcodes may be performed, if required, as will be described with reference to FIG. 3E below.

At step S40 it is determined whether the instruction being executed relates to a so-called indirect branch. It will be appreciated that indirect branches are branches in the sequence of instructions executed by the processor core 6 which occur not as a result of the issue of a conventional branch instruction but are due to the manipulation of, for example, the program counter.

Tracing Branches

When the instruction relates to an indirect branch, a series of steps (S50, S60, S90, S80) are performed which relate to tracing indirect branches. Otherwise, processing proceeds to step S70. Indirect branches are instructions which modify the program counter (pc) with reference to some other component of architectural state, making the destination impossible to infer from the opcode. For example, the instruction B #20 (i.e. add the immediate "20" to the contents of the program counter) is an example of a direct branch since the destination is directly derivable from the opcode. Whereas the instruction ADD pc, pc, r1 (i.e. add the contents of the register r1 to the program counter and store the result in the program counter) is an example of an indirect branch since the destination is not directly derivable from the opcode but is instead dependent on the contents of the register r1. It will be appreciated that the pc is just another item of architectural state whose value does not need to be traced if it is derivable by the trace analysing tool. However, it will also be appreciated that the pc is one item of architectural state which needs to be derivable by the trace analysing tool to ensure proper synchronisation.

If the instruction relates to an indirect branch, then at step S50 it is determined whether the indirect branch involves a load to the pc (i.e. an access from memory whose value is loaded into the program counter).

If the indirect branch does involve a load to the pc then processing proceeds to step S60 where it is determined whether an indication has been made in the table entry for the address of the memory location being accessed that the value stored at that memory location is derivable by the trace analysing tool. The memory location being accessed provides a value which indicates the address to which the indirect branch should be made. If an indication has been made in the table, then no trace element needs be generated and processing proceeds to step S70. If no indication has been made in the table, then at step S65 processing stalls until the data associated with the data transfer is received, thereafter, at step S80, an instruction trace, which indicates that a branch has occurred to a particular address, is issued and processing proceeds to step S70.

If, instead, the indirect branch does not involve a load to the pc (i.e. the instruction does not involve an access from memory, but instead involves accessing one or more registers) then processing proceeds to step S90 where it is determined whether an indication has been made in the table entry for the source register(s) being accessed that the value of that source register(s) is/are derivable by the trace analysing tool. The source register(s) provide a value which indicates the address to which the branch should be made. If such an indication has been made in the table then no trace element needs be generated and processing proceeds to step S70. If no indication has been made in the table then at step S80, an instruction trace, which indicates that a indirect branch has occurred to a particular address, is issued and processing proceeds to step S70.

As mentioned above, if at step S40 it is determined that the instruction does not relate to an indirect branch then processing proceeds directly to step S70.

Hence, for direct branches only an instruction trace need be generated as step S30 since the reference opcode in the trace analysing tool will identify the next instruction to be performed by the processor core 6 and hence the value of the program counter will be derivable which ensures that synchronisation is maintained.

When further data is to be traced, a series of steps (S100, S110, and FIGS. 3B, 3C and 3D) are performed which relate to tracing data associated with instructions such as load, store or data process. Otherwise, processing returns to step S20.

Tracing Data

At step S70, it is determined whether there is data to be traced because, for example, the instruction will modify or change architectural state other than or in addition to the program counter, such as a data transfer. If no further data is to be traced then processing proceeds back to step S20. If there is further data to be traced then processing proceeds to step S100 where processing stalls until the data associated with the data transfer is received. Once the data is received processing proceeds to step S110.

At step S110 the type of data transfer is determined.

Figure 3B:
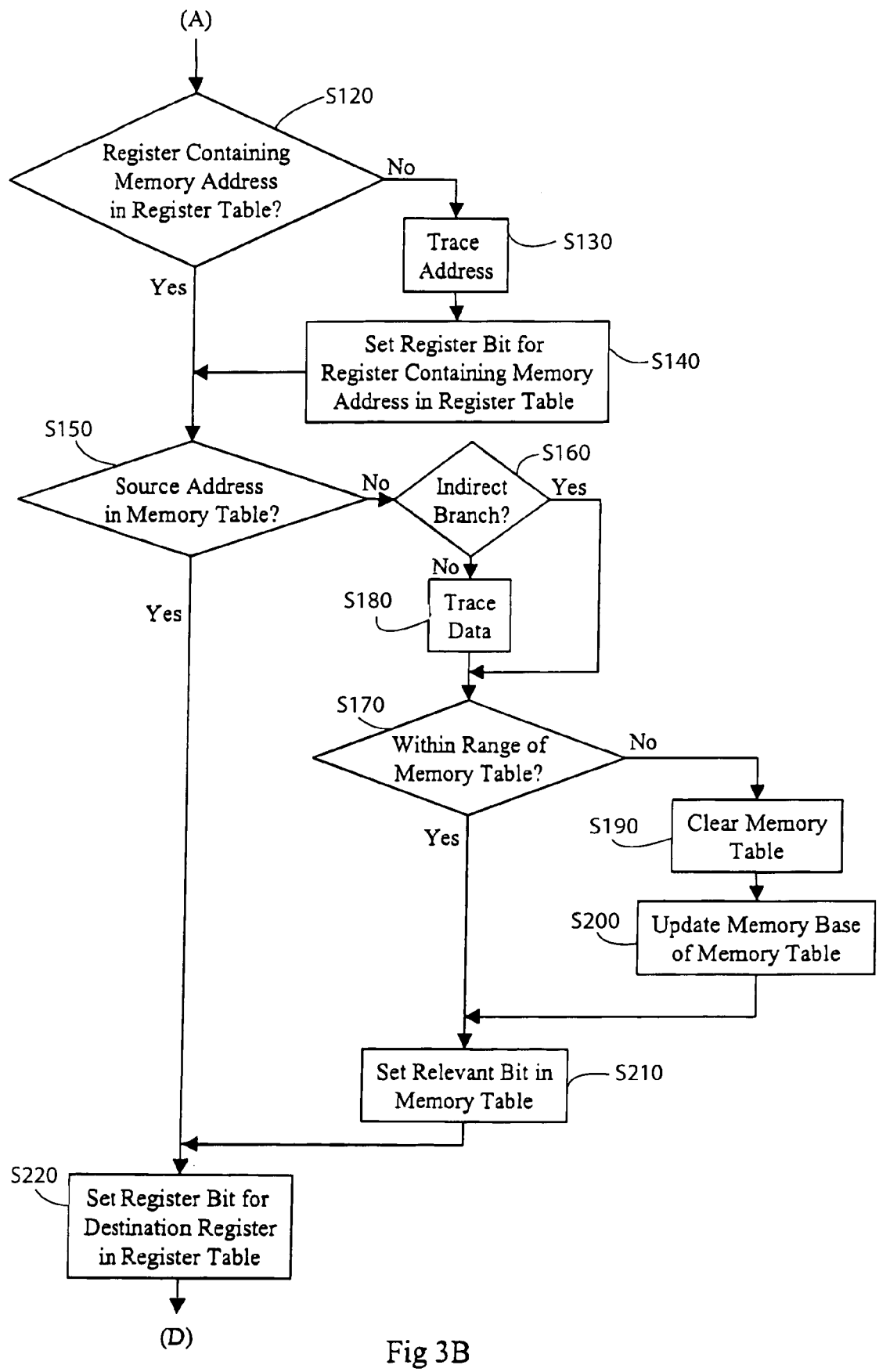

If at step S110 it is determined that the data transfer relates to a load instruction (i.e. an access from memory which is to be stored in a register) then processing proceeds to step S120, as illustrated in FIG. 3B.

Figure 3C:
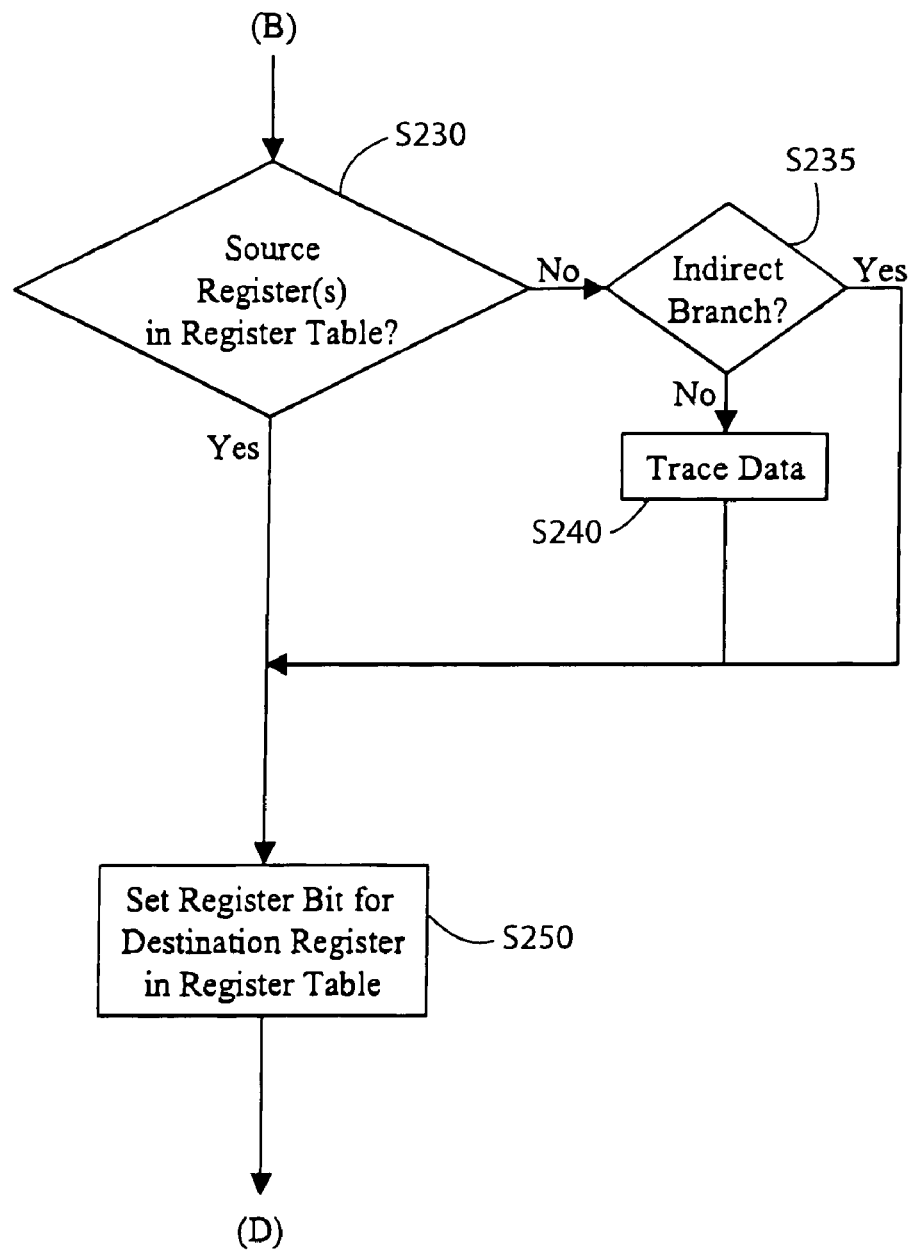

If at step S110 it is determined that the data transfer relates to a data process instruction (i.e. an operation on the values contained in one or more source registers, the result of which is to be stored in a destination register) then processing proceeds to step S230, as illustrated in FIG. 3C.

Figure 3D:
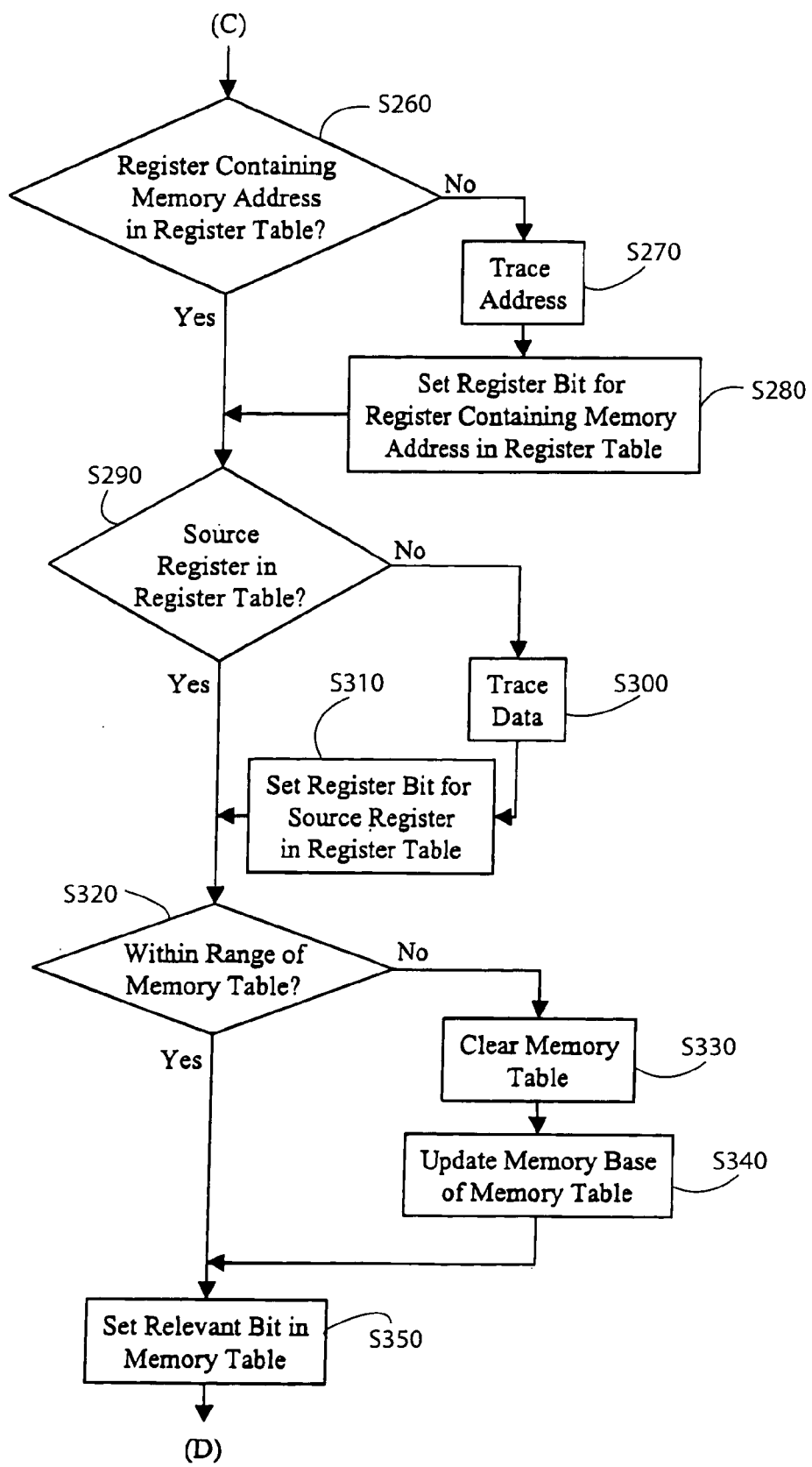

If at step S110 it is determined that the data transfer relates to a store instruction (i.e. an access from a register which is to be stored in memory) then processing proceeds to step S260, as illustrated in FIG. 3D.

Load Instructions

FIG. 3B illustrates the processing steps for tracing a load instruction.

At step S120 it is determined whether the contents of the register containing a value corresponding to the address in memory to be accessed is derivable by the trace analysing tool by determining whether an indication has been made in the register table entry associated with that register. It will be appreciated that for some complex addressing modes, the register or registers from which the address in memory is derived must be derivable by the trace analysing tool.

If it is determined that the contents of the register is not derivable because no indication has been made in the register table entry associated with that register then processing proceeds to step S130. At step S130 an address trace is issued and processing then proceeds to step S140. At step S140, the register table entry associated with the register containing the value corresponding to the address in memory to be accessed is updated to indicate that the contents of the register is derivable by the trace analysing tool. However, as mentioned above, in some complex addressing modes which utilise, for example, multiple registers it may not be possible to determine or even infer the contents of the register or registers in which case no such indication is made against the associated register table entries.

If it is determined that the contents of the register is derivable because an indication has been made in the register table entry associated with that register then no address trace is required and processing proceeds to step S150.

At step S150 it is determined whether the contents of the memory address to be accessed is derivable by the trace analysing tool by determining whether an indication has been made in the memory table entry associated with that memory address.

If it is determined that the contents of the memory address to be accessed is not derivable because no indication has been made in the memory table entry associated with that memory address then processing proceeds to step S160.

At step S160 it is determined whether the load instruction is a load to the program counter which will result in an indirect branch.

If it is determined that the load instruction will result in an indirect branch then no trace element need be generated (because a trace element will have already been generated at step S80) and processing proceeds to step S170.

If it is determined that the load instruction will not result in an indirect branch then a data trace element indicative of the contents of the memory address to be accessed is issued at step S180 and processing proceeds to step S170.

At step S170 it is determined whether the memory address to be accessed is within the current range of the memory table.

If it is determined that the memory address to be accessed is not within the current range of the memory table then the range of the memory table is adjusted at steps S190 and S200. At step S190, all entries in the memory table are cleared and at step S200 the memory base address of the memory table is updated and processing proceeds to step S210. An example update of the memory base address will be illustrated in more detail with reference to FIGS. 4A and 4B below.

If it is determined that the memory address to be accessed is within the current range of the memory table then processing proceeds to step S210.

At step S210, the entry in the memory table associated with the memory address to be accessed is updated to indicate that the contents of this memory address is derivable by the trace analysing tool and processing proceeds to step S220.

However, if at step S150 it is determined that the contents of the memory address to be accessed is derivable because an indication has been made in the memory table entry associated with that memory address then no trace element needs be generated and processing proceeds directly to step S220.

At step S220, the entry in the register table associated with the register into which data is to be loaded is updated to indicate that the content of this register is derivable by the trace analysing tool and processing returns to step S20.

Data Process Instructions

FIG. 3C illustrates the processing steps for tracing a data process instruction.

At step S230 it is determined whether the value(s) of the source register(s) are derivable by the trace analysing tool by determining whether an indication has been made in the register table entry associated with each source register.

If it is determined that the value of the source register(s) are not derivable because no indication has been made in the register table entries associated with those source registers then processing proceeds to step S235.

At step S235 it is determined whether the data process instruction involves manipulation of the program counter which will result in an indirect branch.

If it is determined that the data process instruction will result in an indirect branch then no trace element need be generated (because a trace element will have already been generated at step S80) and processing proceeds to step S250.

If it is determined that the data process instruction will not result in an indirect branch then at step S240 trace element(s) are generated which are indicative of the new value of the destination register and processing proceeds to step S250.

However, if at step S230 it is determined that the value of the source register(s) are derivable because an indication has been made in the register table entries associated with those source registers then no trace elements need be generated and processing proceeds to step S250.

At step S250, the entry in the register table associated with the destination register is updated to indicate that the content of this register is derivable by the trace analysing tool and processing returns to step S20.

Store Instructions

FIG. 3D illustrates the processing steps for tracing a store instruction.

At step S260 it is determined whether the contents of the register containing a value corresponding to the address in memory into which data is to be stored is derivable by the trace analysing tool by determining whether an indication has been made in the register table entry associated with that register. It will be appreciated that for some complex addressing modes, the register or registers from which the address in memory is derived must be derivable by the trace analysing tool.

If it is determined that the contents of the register is not derivable because no indication has been made in the register table entry associated with that register then processing proceeds to step S270. At step S270 an address trace is issued and processing then proceeds to step S280. At step S280, the register table entry associated with the register containing the value corresponding to the address in memory into which data is to be stored is updated to indicate that the contents of the register is derivable by the trace analysing tool, and processing proceeds to step S290. However, as mentioned above, in some complex addressing modes which utilise, for example, multiple registers it may not be possible to determine or even infer the contents of the register or registers in which case no such indication is made against the associated register table entries.

If it is determined that the contents of the register is derivable because an indication has been made in the register table entry associated with that register then no address trace is required and processing proceeds directly to step S290.

At step S290 it is determined whether the value of the source register is derivable by the trace analysing tool by determining whether an indication has been made in the register table entry associated with that register.

If it is determined that the value of the source register is not derivable because no indication has been made in the register table entry associated with that source register then processing proceeds to step S300. At step S300 a trace element is generated which is indicative of the value of the source register and processing proceeds to step S310. At step S310, the entry in the register table associated with the source register is updated to indicate that the content of this register is derivable by the trace analysing tool and processing proceeds to step S320.

However, if at step S290, it is determined that the value of the source register is derivable because an indication has been made in the register table entry associated with that source register then no trace elements need be generated and processing proceeds directly to step S320.

At step S320 it is determined whether the memory address into which data is to be stored is within the current range of the memory table.

If it is determined that the memory address is not within the current range of the memory table then the range of the memory table is adjusted at steps S330 and S340. At step S330, all entries in the memory table are cleared and at step S340 the memory base address of the memory table is updated and processing proceeds to step S350.

However, if at step S320, it is determined that the memory address into which data is to be stored is within the current range of the memory table then processing proceeds directly to step S350.

At step S350, the entry in the memory table associated with the memory address into which data is to be stored is updated to indicate that the contents of this memory address is derivable by the trace analysing tool and processing returns to step S20.

Trace Opcodes

Figure 3E:
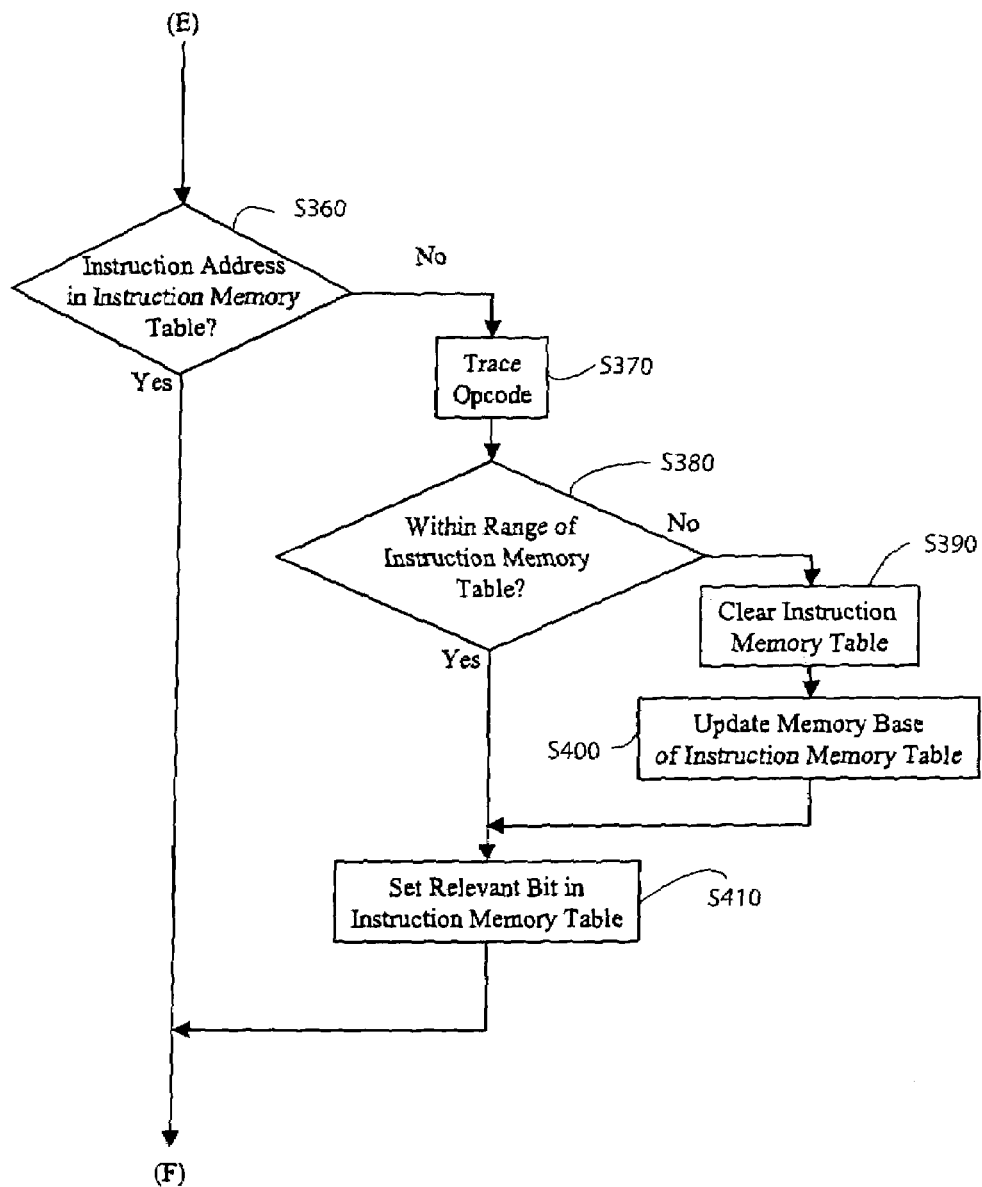

FIG. 3E illustrates an optional series of steps relating to the tracing of opcodes. As mentioned above, the trace analysing tool stores reference opcodes which are used to interpret the trace elements being generated by the trace generation logic in order to reconstruct the architectural state of the data processing apparatus 2. The position in the opcode within the trace analysing tool is synchronised with the instruction being executed by the processor core 6. If the instruction being executed by the processor core 6 is not included within the reference opcodes in the trace analysing tool then the steps illustrated in FIG. 3E advantageously enable that opcode to be traced.

Typically, a separate instruction memory table is provided which provides an indication of the reference opcodes included within the trace analysing tool. This is because instructions and data will typically reside in different portions of memory. However, it will be appreciated that the same table as that used to provide an indication of whether a particular memory address is derivable by the trace analysing tool could equally be used.

Hence, at step S360 it is determined whether an instruction being processed by the processor core 6 is derivable by the trace analysing tool by determining whether an indication has been made in the instruction memory table entry associated with the memory address of the instruction.

If it is determined at step S360 that the instruction is not derivable because no indication has been made in the instruction memory table entry associated with the memory address of that instruction then processing proceeds to step S370. At step S370 a trace element is generated indicative of the instruction being processed by the processor core 6 and processing proceeds to step S380.

At step S380 it is determined whether the memory address of the instruction is within the current range of the instruction memory table.

If it is determined at step S380 that the memory address of the instruction is not within the current range of the instruction memory table then the range of the instruction memory table is adjusted at steps S390 and S400. At step S390, all entries in the instruction memory table are cleared and at step S400 the memory base address of the instruction memory table is updated and processing proceeds to step S410.

If it is determined at step S380 that the memory address of the instruction is within the current range of the instruction memory table then processing proceeds directly to step S410.

At step S410, the entry in the instruction memory table associated with the memory address of the instruction is updated to indicate that this instruction is derivable by the trace analysing tool and processing proceeds to step S40.

However, if it is determined at step S360 that the instruction is derivable because an indication has been made in the instruction memory table entry associated with the memory address of that instruction then processing proceeds directly to step S40.

FIGS. 4A and 4B illustrate example instructions executed by the processor core together with the associated trace elements and table entries generated by the trace generation logic 120 of the on-chip trace module 10.

The following assumes that a triggerable event has occurred, that trigger 110 has enabled the trace generation logic 120 to generate trace elements, that the instruction in the position in the reference opcode stored in the trace analysing tool has been synchronised with the instruction being executed by the processor core 6. Also, the following assumes that all instructions are derivable by the trace analysing tool and that no opcode trace is required. Furthermore, it is assumed that separate register, memory and opcode tables are provided.

Where a trace is issued, it is assumed that it will be represented in such a manner that its type, position and any associated values or parameters can be identified using techniques similar to known trace protocols. Such protocols may require placeholders to be inserted where a trace is suppressed due to the change in architectural state with which the trace is associated being derivable.

At step S20, the trace generation logic 120 waits to receive an instruction.

The instruction or opcode LDR r1, [r0] (i.e. load the value stored in the memory address referred to by the contents of r0 into r1) is received (as shown at 1a in FIG. 4A).

At step S22 it is determined whether the tables are to be cleared. Typically, the clearing occurs following the triggerable event and periodically thereafter. For example, the clearing could be arranged to be performed every 'n' instructions. In this case it is determined that the register and memory tables are to be cleared and at step S24 the entries in those tables are cleared (it will be appreciated, however, that all tables could be cleared or reset if required).

At step S30 an instruction trace is issued (as shown at 1b in FIG. 4A) to maintain opcode synchronisation between the processor core 6 and the trace analysing tool. For illustrative purposes, it is assumed that the register r0 contains the value "00002000" and the value "aa" is stored at the memory address "00002000".

At step S40 it is determined that the instruction is not related to an indirect branch, at step S70 it is determined that the instruction is instead related to a data transfer and at step S100 the trace generation logic 120 waits to receive an; indication of the data accessed from memory.

At step S110 it is determined that the instruction is a load instruction and processing proceeds to step S120.

Because all the register tables have been cleared, there is no indication in the register entry for register r0 that the contents of this register is derivable by the trace analysing tool and the contents of r0, namely the value "00002000", is traced (as shown at 1c in FIG. 4A) at step S130. Thereafter, the entry in the register table associated with r0 is set (as shown at 1d in FIG. 4A) because the contents of this register is now derivable by the trace analysing tool.

Because all the memory tables have been cleared, there is no indication in the memory entry for memory address "00002000" that the contents of this address is derivable by the trace analysing tool. Hence, because the load instruction is not an indirect branch the contents of memory address "00002000", namely the value "aa" is traced (as shown at e in FIG. 4A) at step S180.

At step S170, because all the memory tables have been cleared, it is determined that the memory address "00002000" is not within the range of the memory table and at step S200, the memory base address is updated (as shown at 1f in FIG. 4A). The memory base address stores the five most significant bits (MSBs) of the address and at step S210, the entry in the memory table associated with the memory address is updated (as shown at 1g in FIG. 4A) to indicate that the content of this memory address is derivable by the trace analysing tool.

At step S220, because the contents of the register r1, namely the value "aa", is now derivable by the trace analysing tool, the entry associated with r1 is updated in the register table (as shown at 1h in FIG. 4A) and processing returns to step S20 to await the next instruction.

Next, the instruction or opcode ADD r2, r1, #1 (i.e. add the immediate "1" to the value stored in the source register r1 and store the result in the destination register r2) is received (as shown at 2a in FIG. 4A). At step S22 it is determined that the register and memory tables are not to be cleared and at step S30 an instruction trace is issued (as shown at 2b in FIG. 4A) to maintain opcode synchronisation between the processor core 6 and the trace analysing tool.

At step S40 it is determined that the instruction is not related to an indirect branch, at step S70 it is determined that the instruction is instead related to a data transfer and at step S100 the trace generation logic 120 waits to receive an indication of the data accessed from memory.

At step S110 it is determined that the instruction is a data process instruction and processing proceeds to step S230.

At step S230 it is determined that the contents of the source register is derivable by the trace analysing tool because an indication has been made in the entry associated with r1 in the register table. Hence, no trace element indicative of the contents of r2 need be generated. Instead, the entry in the register table associated with r2 is simply updated at step S250 (as shown at 2c in FIG. 4A) because the contents of this register is derivable by the trace analysing tool and processing returns to step S20 to await the next instruction.

Next, the instruction or opcode ADD r4, r2, r3 (i.e. add the value stored in the source register r2 to the value stored in the source register r3 and store the result in the destination register r4) is received (as shown at 3a in FIG. 4A). At step S22 it is determined that the register and memory tables are not to be cleared and at step S30 an instruction trace is issued (as shown at 3b in FIG. 4A) to maintain opcode synchronisation between the processor core 6 and the trace analysing tool.

At step S40 it is determined that the instruction is not related to an indirect branch, at step S70 it is determined that the instruction is instead related to a data transfer and at step S100 the trace generation logic 120 waits to receive an indication of the data accessed from memory.

At step S110 it is determined that the instruction is a data process instruction and processing proceeds to step S230.

At step S230 it is determined that the contents of both source registers are not derivable by the trace analysing tool because no indication has been made in the entry associated with r3 in the register table. At step S235 it is determined that the instruction does not involve the program counter and so does not involve an indirect branch. Hence, a trace element indicative of the contents to be stored in r4 is generated at step S240 (as shown at 3c in FIG. 4A) and the entry in the register table associated with r4 is updated at step S250 (as shown at 3d in FIG. 4A) because the contents of this register is derivable by the trace analysing tool and processing returns to step S20 to await the next instruction.

Next, the instruction or opcode STR r4, [r0+#4] (i.e. store the contents of the source register r4 into the memory address derived from adding the immediate "4" to the value stored in the memory address register r0) is received (as shown at 4a in FIG. 4A). At step S22 it is determined that the register and memory tables are not to be cleared and at step S30 an instruction trace is issued (as shown at 4b in FIG. 4A) to maintain opcode synchronisation between the processor core 6 and the trace analysing tool.

At step S40 it is determined that the instruction is not related to an indirect branch, at step S70 it is determined that the instruction is instead related to a data transfer and at step S100 the trace generation logic 120 processing proceeds to step S110 since there is no need to wait to receive an indication of the data accessed from memory.

At step S110 it is determined that the instruction is a store instruction and processing proceeds to step S260.

At step S260 it is determined that the contents of the register containing the memory address (r0) and at step S290 it is determined that the contents of the source register (r4) are both derivable by the trace analysing tool because indications have been made in the entries associated with r0 and r4 in the register table. Hence, no trace element indicative of the contents to be stored in the memory address "00002004" need be generated.

Also, because the address "00002004" is determined to be within the range of the memory table, the entry in the memory table associated with the address "00002004" is simply updated at step S350 (as shown at 4c in FIG. 4A) because the contents of this memory address is derivable by the trace analysing tool and processing returns to step S20 to await the next instruction.

Next, the instruction or opcode STR r5, [r0] (i.e. store the contents of the source register r5 into the memory address whose value is stored in the memory address register r0) is received (as shown at 5a in FIG. 4B). At step S22 it is determined that the register and memory tables are not to be cleared and at step S30 an instruction trace is issued (as shown at 5b in FIG. 4B) to maintain opcode synchronisation between the processor core 6 and the trace analysing tool.

At step S40 it is determined that the instruction is not related to an indirect branch, at step S70 it is determined that the instruction is instead related to a data transfer and at step S100 the trace generation logic 120 processing proceeds to step S110 since there is no need to wait to receive an indication of the data accessed from memory.

At step S110 it is determined that the instruction is a store instruction and processing proceeds to step S260.

At step S260 it is determined that the contents of the register containing the memory address (r0) is derivable by the trace analysing tool because an indication has been made in the entry associated with r0 in the register table. Hence, no trace element indicative of the contents of r0 need be generated.

At step S290 it is determined that the contents of the source register (r5) is not derivable by the trace analysing tool because no indication has been made in the entry associated with r5 the register table. Hence, at step S300, a trace element indicative of the contents of r5, namely the value "cc" is generated (as shown at 5c in FIG. 4B) and the entry in the register table associated with r5 is updated at step S310 to indicate that the contents of this register is derivable by the trace analysing tool (as shown at 5d in FIG. 4B).

Also, because the address "00002000" is determined at step S320 to be within the range of the memory table, the entry in the memory table associated with the address "00002000" is simply updated at step S350 because the contents of this memory address is derivable by the trace analysing tool (although no change is evident since the entry for this memory address has already been set) and processing returns to step S20 to await the next instruction.

Next, the instruction or opcode MOV pc, r6 (i.e. change the value of the program counter to the value stored in the source register r6) is received (as shown at 6a in FIG. 4B). At step S22 it is determined that the register and memory tables are not to be cleared and at step S30 an instruction trace is issued (as shown at 6b in FIG. 4B) to maintain opcode synchronisation between the processor core 6 and the trace analysing tool.

At step S40 it is determined that the instruction is related to an indirect branch, at step S50 that the indirect branch does not involve load from memory to the program counter and at step S90 it is determined that the contents of the source register (r6) is not derivable by the trace analysing tool because no indication has been made in the entry associated with r6 in the register table. Hence, at step S80, a trace element indicating a branch to the memory address specified by the contents of r6, namely the value "dd" is generated (as shown at 6c in FIG. 4B). Because a branch instruction trace has been issued which specifies the change in the value stored in the program counter the performing a data trace of the contents of the register r6 can be suppressed and processing returns via step S70 to step S20 to await the next instruction. It will be appreciated that as a further step, it is possible to infer the contents of the register r6 and that the entry associated with r6 in the register table could be updated.

Next, the instruction or opcode MOV pc, r1 (i.e. change the value of the program counter to the value stored in the source register r1) is received (as shown at 7a in FIG. 4B). At step S22 it is determined that the register and memory tables are not to be cleared and at step S30 an instruction trace is issued (as shown at 7b in FIG. 4B) to maintain opcode synchronisation between the processor core 6 and the trace analysing tool.

At step S40 it is determined that the instruction is related to an indirect branch, at step S50 that the indirect branch does not involve load from memory to the program counter and at step S90 it is determined that the contents of the source register (r1) is derivable by the trace analysing tool because an indication has been made in the entry associated with r1 in the register table. Hence, no trace element indicating a branch to the memory address specified by the contents of r1 need be generated because the change in the value of the program counter can be implied. Accordingly, the data trace and the branch instruction trace are suppressed and processing returns via step S70 to step S20 to await the next instruction. As mentioned previously, it would be possible to output a placeholder to indicate to the trace analysing tool that the suppression has occurred.

Next, the instruction or opcode LDR r2, [r0+#4] (i.e. load into r2 the value stored in the memory address referred to by adding the immediate "4" to the contents of r0) is received (as shown at 8a in FIG. 4B). At step S22 it is determined that the register and memory tables are not to be cleared and at step S30 an instruction trace is issued (as shown at 8b in FIG. 4B) to maintain opcode synchronisation between the processor core 6 and the trace analysing tool.

At step S40 it is determined that the instruction is not related to an indirect branch, at step S70 it is determined that the instruction is instead related to a data transfer and at step S100 the trace generation logic 120 waits to receive an indication of the data accessed from memory.

At step S110 it is determined that the instruction is a load instruction and processing proceeds to step S120.

At step S120 it is determined that the register containing the memory address (r0) is derivable by the trace analysing tool because there is an indication in the register entry for register r0. Hence, the value of r0 does not need to be traced and processing proceeds directly to step S150.

At step S150 it is determined that the contents of the source memory address (00002004) is derivable by the trace analysing tool because there is an indication in the memory entry for memory address "00002004". Hence, the value of the contents of the memory address "00002004", namely "bb", does not need to be traced and processing proceeds directly to step S220.

At step S220 the entry in the memory table associated with the address "00002004" is updated (although no change is evident since the entry for this memory address has already been set) and processing returns to step S20 to await the next instruction.

Next, the instruction or opcode LDR pc, [r–#4] (i.e. load into the program counter the value stored in the memory address referred to by subtracting the immediate "4" from the contents of r0) is received (as shown at 9a in FIG. 4B). At step S22 it is determined that the register and memory tables are not to be cleared and at step S30 an instruction trace is issued (as shown at 9b in FIG. 4B) to maintain opcode synchronisation between the processor core 6 and the trace analysing tool.

At step S40 it is determined that the instruction is related to an indirect branch. At step S50 it is determined that the instruction involves a load to the program counter and at step S60 that the source address (00001ffc) is not in the memory table because no indication has been made in the entry associated with that address. Hence, at step S65 processing stalls until the data associated with the load is received and at step S80 a trace element indicating that a branch to address "ee" (as shown at 9c in FIG. 4B) is issued and processing proceeds to step S70.

At step S70 it is determined that the instruction is related to a data transfer and at step S100 the trace generation logic 120 waits to receive an indication of the data accessed from memory.

At step S110 it is determined that the instruction is a load instruction and processing proceeds to step S120.

At step S120 it is determined that the register containing the memory address (r0) is derivable by the trace analysing tool because there is an indication in the register entry for register r0. Hence, the value of r0 does not need to be traced and processing proceeds directly to step S150.

At step S150 it is determined that the contents of the source memory address (00001ffc) is not derivable by the trace analysing tool because there is no indication in the memory entry for memory address "00001 ffc".

At step S160 it is determined that because the instruction involves a load to the program counter, this instruction is an indirect branch and hence no data trace is necessary since the contents of the source address (00001ffc), i.e. the value "ee", has already been traced at step S80 and, hence, the performing a data trace of the contents of the contents of the source address (00001 ffc) can be suppressed and processing proceeds to step S170.

At step S170 it is determined that the memory address "00001ffc" is not within the range of the memory table. Hence, at step S190 the memory table is cleared (as shown at 9d in FIG. 4B), at step S200 the memory base address is updated to "00001xxx" (as shown at 9e in FIG. 4B) and at step S210, the entry in the memory table associated with the memory address (namely "00001ffc") is updated (as shown at 9f in FIG. 4B) to indicate that the content of this memory address is derivable by the trace analysing tool. Alternatively, as mentioned previously, a further table may be provided whose base address is set to "00001xxx" or the existing memory table may be arranged to be cleared only when a number of successive accesses are made to memory addresses outside the range of the memory table in order to improve table stability.

At step S220, the entry associated with the program counter register is updated in the register table (not shown since no change would be noticeable because the value of the program counter will always be derivable using the instruction trace) and processing returns to step S20 to await the next instruction.

It will be appreciated that although for illustrative purposes, the above examples relate to simple instructions whereby a change in a single item of architectural state is traced, tracing of more complex instructions whereby changes in multiple items of architectural state are required to be traced could equally be performed. For example, the complex instruction could be considered as a number of simple instructions, each simple instruction causing the change in one item of architectural state to be traced. Alternatively, a placeholder could be provided for changes in each item of architectural state which are not required to be traced.

To illustrate this, consider the example instruction or opcode LDM r0{r1–r4} (i.e. load into r1 the value stored in the memory address referred to by contents of r0, load into r2 the value stored in the memory address referred to by adding the immediate #4 (or some other constant) to the contents of r0, load into r3 the value stored in the memory address referred to adding the immediate #8 to the contents of r0, load into r4 the value stored in the memory address referred to adding the immediate #12 to the contents of r0).

Assume now that, for illustrative purposes, the contents of the register r0 is derivable, that the contents of the memory address referred to by contents of the register r0 is derivable and that the contents of the memory address referred to by adding the immediate #12 contents of the register r0 is derivable. However, also assume that the contents of the memory address referred to by adding the immediate #4 contents of the register r0 is not derivable and that the contents of the memory address referred to by adding the immediate #8 contents of the register r0 is not derivable.

In the example where the instruction is represented by a series of simple instructions, namely, LDR r0, [r0]; LDR r2,[r0,#4]; LDR r3,[r0,#8]; and LDR r4,[r0,#12], the following trace elements are generated.

For LDR r0, [r0], an instruction trace is issued and no data trace is issued since the contents of the of the memory address referred to by the contents of the register r0 is derivable.

For LDR r2, [r0,#4], an instruction trace is issued and a data trace indicative of the contents of the memory address referred to by adding the immediate #4 to the contents of the register r0 is issued since the contents of that memory address is not derivable.

For LDR r3, [r0,#8], an instruction trace is issued and a data trace indicative of the contents of the memory address referred to by adding the immediate #8 to the contents of the register r0 is issued since the contents of that memory address is not derivable.

For LDR r4, [r0,#12], an instruction trace is issued and no data trace is issued since the contents of the of the memory address referred to by adding the immediate #8 to the contents of the register r0 is derivable.

In the alternative example which utilises placeholders, a single instruction trace is issued and the data trace takes the form placeholder, data trace, data trace, placeholder. The issue of the first placeholder indicates to the trace analysing tool that the contents of the of the memory address referred to by the contents of the register r0 is derivable. The first data trace is indicative of the contents of the memory address referred to by adding the immediate #4 to the contents of the register r0 and is issued since the contents of that memory address is not derivable. The second data trace is indicative of the contents of the memory address referred to by adding the immediate #8 to the contents of the register r0 and is issued since the contents of that memory address is not derivable. The issue of the second placeholder indicates to the trace analysing tool that the contents of the of the memory address referred to by adding the immediate #12 to the contents of the register r0 is derivable.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A trace module operable to trace changes in a subset of architectural state of a data processing apparatus with which the trace module is coupled, said trace module comprising:
   a trace generation unit operable to receive input signals from one or more components of said data processing apparatus indicative of a change in said subset of architectural state and to generate from one or more of said input signals a number of trace elements indicative of said change so as to enable a recipient of said trace elements to subsequently reconstruct said subset of architectural state; and
   a table maintained by said trace generation unit to identify architectural state derivable from previously generated trace elements, said trace generation unit referencing said table in order to determine which trace elements to generate during said trace generation.

2. A trace module as claimed in claim 1, wherein said subset of architectural state comprises a number of items of architectural state and said table has one or more entries associated with each item of architectural state, said trace generation unit being operable to make an indication in each entry when said item of architectural state is derivable by said recipient.

3. A trace module as claimed in claim 2, wherein in response to the receipt of one or more of said input signals, said trace generation unit is operable to determine whether said change in an item of architectural state is derivable by said recipient by determining whether an indication has been made in each entry associated with that item of architectural state.

4. A trace module as claimed in claim 2, wherein in response to the receipt of one or more of said input signals, said trace generation unit is operable to determine whether said change in an item of architectural state is derivable by said recipient by determining whether an indication has been made in each entry associated with items of architectural state utilised to effect said change in said item of architectural state.

5. A trace module as claimed in claim 2, wherein said trace generation unit is operable to generate a number of trace elements indicative of said change in said item of architectural state not derivable by said recipient and to make an indication in each entry associated with that item of architectural state.

6. A trace module as claimed in claim 1, wherein each item of architectural state has an architectural state value and said trace generation is operable to generate a number of trace elements indicative of said change in said architectural state value.

7. A trace module as claimed in claim 6, wherein said change in said architectural state value causes said item of architectural state to have a new value, said trace generation unit being operable to generate a number of trace elements indicative of said new value when said new value is not derivable by said recipient and to make an indication in each entry associated with that item of architectural state.

8. A trace module as claimed in claim 1, wherein said subset of architectural state comprises contents of a number of registers and said table has a register entry associated with each of said number of registers.

9. A trace module as claimed in claim 8, wherein in response to an input signal indicative of a change in the contents of a register to a new value, said trace generation unit is operable to make an indication in each entry associated with that register when said new value is derivable by said recipient.

10. A trace module as claimed in claim 8, wherein in response to an input signal indicative of a change in the contents of a register to a new value, said trace generation unit is operable to generate a number of trace elements indicative of said new value when said new value is not derivable by said recipient and to make an indication in each entry associated with that register.

11. A trace module as claimed in claim 8, wherein said number of registers includes a number of source registers and a number of destination registers and in response to an input signal indicative of a change in the contents of a destination register to a new value dependent on the contents one or more of said source registers, said trace generation unit is operable to generate a number of trace elements indicative of said new value when said new value is not derivable by said recipient and to make an indication in each entry associated with said destination register.

12. A trace module as claimed in claim 8, wherein said number of registers include a number of source registers and a number of destination registers and, in response to an input signal indicative of a change in the contents of a destination register to a new value dependent on the contents of one or more of said source registers, said trace generation unit is operable to make an indication in each entry associated with said destination register when said new value is derivable by said recipient.

13. trace module as claimed in claim 8, wherein said number of registers include a number of destination registers, said architectural state further comprises contents of a number of memory addresses and, in response to an input signal indicative of a change in the contents of a destination register to a new value dependent on the contents of one or more of said memory addresses, said trace generation unit is operable to generate a number of trace elements indicative of said one or more memory addresses when said one or more memory addresses are not derivable by said recipient and to make an indication in each entry associated with said one or more memory addresses.

14. A trace module as claimed in claim 8, wherein said number of registers include a number of destination registers, said architectural state further comprises contents of a number of memory addresses and, in response to an input signal indicative of a change in the contents of a destination register to a new value dependent on the contents of one or more of said memory addresses, said trace generation unit is operable to make an indication in each entry associated with said one or more memory addresses when said new value is derivable by said recipient.

15. A trace module as claimed in claim 1, wherein said subset of architectural state comprises contents of a number of memory addresses and said table has an address entry associated with each of said number of memory addresses.

16. A trace module as claimed in claim 15, wherein in response to an input signal indicative of the contents of a memory address changing to a new value, said trace generation unit is operable to make an indication in each address entry associated with that memory address when said new value is derivable by said recipient.

17. A trace module as claimed in claim 15, wherein in response to an input signal indicative of the contents of a memory address changing to a new value, said trace generation unit is operable to generate a number of trace elements indicative of said new value when said new value is not derivable by said recipient and to make an indication in each address entry associated with that memory address.

18. A trace module as claimed in claim 15, wherein in response to an input signal indicative of the contents of a memory address changing to a new value dependent on one or more registers, said trace generation unit is operable to make an indication in each address entry associated with that memory address when said new value is derivable by said recipient.

19. A trace module as claimed in claim 15, wherein in response to an input signal indicative of the contents of a memory address changing to a new value dependent on one or more registers, said trace generation unit is operable to generate a number of trace elements indicative of said new value when said new value is not derivable by said recipient and to make an indication in each address entry associated with that memory address.

20. A trace module as claimed in claim 19, wherein in response to an input signal indicative of the contents of a memory address changing to a new value, said trace generation unit is operable to generate a number of trace elements indicative of said memory address when said memory address is not derivable by said recipient and to make an indication in each register entry providing that memory address.

21. A trace module as claimed in claim 15, wherein said table comprises one or more tables, each having a base address entry associated with a base memory address and an address entry associated with each of a range of memory addresses logically offset from said base address, said trace generation unit being operable to determine, in response to an input signal indicative of the contents of a memory address changing to a new value, whether said memory address is within one of said ranges and, if so, to make an indication in said address entry associated with that memory address.

22. A trace module as claimed in claim 21, wherein said trace generation unit is operable to determine, in response to an input signal indicative of the contents of a memory address changing to a new value, whether said memory address is within one of said ranges and, if not, to clear all address entries in one of said tables, to update the base address entry of that table, to generate a number of trace elements indicative of said new value and to make an indication in said address entry associated with said memory address.

23. A trace module as claimed in claim 22, wherein said base address entry is arranged to store at least part of a logical memory address.

24. A trace module as claimed in claim 1 wherein entries in said table are cleared periodically.

25. A trace module as claimed in claim 1, wherein said trace generation unit is operable to generate an instruction trace element indicative of an instruction being executed.

26. A trace module as claimed in claim 1, wherein said change in said subset of architectural state causes said data processing apparatus to execute an instruction which is out of sequence and said trace generation unit is operable to generate a branch trace element indicative of said out of sequence instruction to be executed.

27. A trace module as claimed in claim 26 wherein said recipient is a trace analysing tool and said table identifies said subset of architectural state derivable by said trace analysing tool.

28. A trace module as claimed in claim 27, wherein said trace analysing tool is provided with an indication of sequential instructions to be executed by said data processing apparatus.

29. A trace module as claimed in claim 28, wherein each sequential instruction has an address associated therewith and said trace generation unit is operable to determine whether an address of said out of sequence instruction is derivable by said trace analysing tool by determining whether an indication has been made in each entry associated with items of architectural state utilised to effect said change in said item of architectural state which causes said data processing apparatus to execute said out of sequence instruction.

30. A trace module as claimed in claim 28, wherein said table identifies said indication of sequential instruction to be executed by said data processing apparatus.

31. A trace module as claimed in claim 30, wherein said trace generation unit is operable to determine in response to said input signals indicative of an instruction being executed whether said trace analysing tool is able to determine said instruction being executed by referencing said table and to generate a number of trace elements indicative of said instruction when said instruction is not derivable by said trace analysing tool.

32. A trace module operable to trace changes in a program counter value of a data processing apparatus with which the trace module is coupled, said data processing apparatus being arranged to execute a sequence of instructions, said program counter value indicating a next instruction to be executed by said data processing apparatus, said trace module comprising:

a trace generation unit operable to receive input signals from one or more components of said data processing apparatus indicative of a current instruction being executed and to selectively generate from said input signals a data trace element indicative of data associated with said current instruction and a branch trace element indicative of said change in program counter value, and in the event that said current instruction is an indirect branch instruction which causes a non-sequential change in said program counter value, said trace generation unit being operable to suppress the generation of at least one of said data trace element and said branch trace element, when said change in program counter value is derivable from trace elements generated by said trace generation unit, whereby said change in program counter value can be subsequently reconstructed by a recipient of said trace elements generated by said trace generation unit element in order to determine said next instruction to be executed by said data processing apparatus.

33. A trace module as claimed in claim 32, wherein said trace generation unit is operable to suppress the generation of said data trace element, said change in program counter value being derivable by said recipient from said branch trace element.

34. A trace module as claimed in claim 32, wherein said trace generation unit is operable to suppress the generation of said branch trace element, said change in program counter value being derivable by said recipient from said data trace element.

35. A trace module as claimed in claim 32, comprising:
a table maintained by said trace generation unit to identify whether said change in program counter value is derivable from previously generated trace elements, said trace generation unit referencing said table in order to determine which trace elements to generate during said trace generation.

36. A trace module as claimed in claim 35, wherein said trace generation unit is operable to suppress the generation of said data trace element and said branch trace element when it is determined that said change in program counter value is derivable by said recipient.

37. A trace module as claimed in claim 32, wherein said trace generation unit is operable to generate a placeholder indicative of said suppression.

38. A trace module as claimed in claim 32, wherein said trace generation unit generates an instruction trace in response to receipt of said input signals providing an indication that an instruction is being executed by said data processing apparatus.

39. A data processing apparatus comprising said trace module as claimed in claim 1.

40. A method of tracing changes in a subset of architectural state of a data processing apparatus, said method comprising the steps of:
receiving input signals from one or more components of said data processing apparatus indicative of a change in said subset of architectural state;
determining which trace elements to generate by referencing a table identifying architectural state derivable from previously generated trace elements; and
generating a number of trace elements indicative of said change so as to enable a recipient of said trace elements to subsequently reconstruct said subset of architectural state.

41. A method as claimed in claim 40, wherein said subset of architectural state comprises a number of items of architectural state and said table has one or more entries associated with each item of architectural state, said method comprising the step of:
making an indication in each entry when said item of architectural state is derivable by said recipient.

42. A method as claimed in claim 41, wherein said determining step comprises:
determining whether an indication has been made in each entry associated with that item of architectural state.

43. A method as claimed in claim 41, wherein said determining step comprises:
determining whether an indication has been made in each entry associated with items of architectural state utilised to effect said change in said item of architectural state.

44. A method as claimed in claim 41, wherein said generating step comprises:
generating a number of trace elements indicative of said change in said item of architectural state not derivable by said recipient, said method comprising the step of:
making an indication in each entry associated with that item of architectural state.

45. A method as claimed in claim 40, wherein each item of architectural state has an architectural state value and said generating step comprises:
generating a number of trace elements indicative of said change in said architectural state value.

46. A method as claimed in claim 45, wherein said change in said architectural state value causes said item of architectural state to have a new value, said generation step comprises:
generating a number of trace elements indicative of said new value when said new value is not derivable by said recipient, said method comprising the step of:
making an indication in each entry associated with that item of architectural state.

47. A method as claimed in claim 40, wherein said subset of architectural state comprises contents of a number of registers and said table has a register entry associated with each of said number of registers.

48. A method as claimed in claim 47, wherein said receiving step comprises:
receiving input signals indicative of a change in the contents of a register to a new value and said method comprising the step of:
making an indication in each entry associated with that register when said new value is derivable by said recipient.

49. A method as claimed in claim 47, wherein said receiving step comprises:
receiving input signals indicative of a change in the contents of a register to a new value and said generating step comprises:
generating a number of trace elements indicative of said new value when said new value is not derivable by said recipient, said method comprising the step of:
making an indication in each entry associated with that register.

50. A method as claimed in claim 47, wherein said number of registers includes a number of source registers and a number of destination registers and said receiving step comprises:
receiving an input signal indicative of a change in the contents of a destination register to a new value dependent on values of one or more of said source registers, said generation step comprises:
generating a number of trace elements indicative of said new value when said new value is not derivable by said recipient, said method comprising the step of:
making an indication in each entry associated with said destination register.

51. A method as claimed in claim 47, wherein said number of registers include a number of source registers and a number of destination registers and said receiving step comprises:
receiving an input signal indicative of a change in the contents of a destination register to a new value dependent on values of one or more of said source registers, said method comprising:
making an indication in each entry associated with said destination register when said new value is derivable by said recipient.

52. A method as claimed in claim 40, wherein said subset of architectural state comprises contents of a number of memory addresses and said table has an address entry associated with each of said number of memory addresses.

53. A method as claimed in claim 52, wherein said receiving step comprises:

receiving an input signal indicative of the contents of a memory address changing to a new value, said method comprising the step of:

making an indication in each address entry associated with that memory address when said new value is derivable by said recipient.

54. A method as claimed in claim 52, wherein said receiving step comprises:

receiving an input signal indicative of the contents of a memory address changing to a new value, said generating step comprises:

generating a number of trace elements indicative of said new value when said new value is not derivable by said recipient, said method comprising the step of:

making an indication in each address entry associated with that memory address.

55. A method as claimed in claim 52, wherein said table comprises one or more tables, each having a base address entry associated with a base memory address and an address entry associated with each of a range of memory addresses logically offset from said base address, said receiving step comprising the step of:

receiving an input signal indicative of the contents of a memory address changing to a new value, said determining step comprising the step of:

determining whether said memory address is within one of said ranges and, if so, said method comprising the step of:

making an indication in said address entry associated with that memory address.

56. A method as claimed in claim 55, wherein said receiving step comprises the step of:

receiving an input signal indicative of the contents of a memory address changing to a new value, said determining step comprising the step of:

determining whether said memory address is within one of said ranges and, if not, said method comprising the steps of:

clearing all address entries in one of said tables; and updating the base address entry of said one of said tables, and wherein said generating step comprises the step of:

generating a number of trace elements indicative of said new value, said method comprising the step of:

making an indication in said address entry associated with said memory address.

57. A method as claimed in claim 40, comprising the step of:

generating an instruction trace element indicative of an instruction being executed.

58. A method as claimed in claim 40, wherein said change in said subset of architectural state causes said data processing apparatus to execute an instruction which is out of sequence, said method comprising the step of:

generating a trace element indicative of said out of sequence instruction to be executed.

59. A method as claimed in claim 58, wherein said recipient is a trace analysing tool and said table identifies said subset of architectural state derivable by said trace analysing tool.

60. A method as claimed in claim 59, comprising the steps of:

providing said trace analysing tool with an indication of sequential instructions to be executed by said data processing apparatus.

61. A method as claimed in claim 60, wherein each sequential instruction has an address associated therewith and said determining step comprises:

determining whether an address of said out of sequence instruction is derivable by said trace analysing tool by determining whether an indication has been made in each entry associated with items of architectural state utilised to effect said change in said item of architectural state which causes said data processing apparatus to execute said out of sequence instruction.

62. A method as claimed in claim 60, wherein said table identifies said indication of sequential instruction to be executed by said data processing apparatus, said method comprising the steps of:

receiving input signals indicative of an instruction being executed;

determining in response to said input signals indicative of an instruction being executed whether said trace analysing tool is able to determine said instruction being executed by referencing said table and, if not;

generating a number of trace elements indicative of said instruction when said instruction is not derivable by said trace analysing tool.

63. A method of tracing changes in a program counter value of a data processing apparatus, said data processing apparatus being arranged to execute a sequence of instructions, said program counter value indicating a next instruction to be executed by said data processing apparatus, said method comprising the steps of:

receiving input signals from one or more components of said data processing apparatus indicative of a current instruction being executed;

selectively generating from said input signals a data trace element indicative of data associated with said current instruction and a branch trace element indicative of said change in program counter value; and in the event that said current instruction is an indirect branch instruction which causes a non-sequential change in said program counter value, suppressing the generation of at least one of said data trace element and said branch trace element when said change in program counter value is derivable from the trace elements that have been generated.

64. A method as claimed in claim 63, wherein suppressing step comprises:

suppressing the generation of said data trace element, said change in program counter value being derivable by a recipient from said branch trace element.

65. A method as claimed in claim 63, wherein suppressing step comprises:

suppressing the generation of said branch trace element, said change in program counter value being derivable by a recipient from said data trace element.

66. A method as claimed in claim 63, comprising:

determining which trace elements to generate by referencing a table identifying whether said change in program counter value is derivable from previously generated trace elements.

67. A method as claimed in claim 66, wherein said suppressing step comprises:
   suppressing the generation of said data trace element and said branch trace element when it is determined that said change in program counter value is derivable by said recipient.

68. A method as claimed in claim 63, comprising the step of:
   generating a placeholder indicative of said suppression.

69. A method as claimed in claims 63, comprising the step of:
   generating an instruction trace in response to receipt of said input signals providing an indication that an instruction is being executed by said data processing apparatus.

70. A computer program product stored on a computer readable medium operable when executed on a computer to perform the method steps as claimed in claim 40.

* * * * *